US008983869B2

(12) United States Patent (10) Patent No.: US 8,983,869 B2
Flanagan et al. (45) Date of Patent: Mar. 17, 2015

(54) SYSTEMS AND METHODS FOR SUPPORTING REGULATORY REQUIREMENTS FOR THE DISTRIBUTION OF CONTROLLED AND NON-CONTROLLED ITEMS

(71) Applicant: United Parcel Service of America, Inc., Atlanta, GA (US)

(72) Inventors: Mike Flanagan, Florida, NY (US); Benny Delgado, Cumming, GA (US); Cheryl Wilson, Cumming, GA (US); Rohit Oberai, Alpharetta, GA (US); Preeti Singh, Alpharetta, GA (US); Richa Aggarwal, Cumming, GA (US); Amy Carney, Elkton, MD (US); Anilkumar Menon, Alpharetta, GA (US); Hammad Z. Muhammad, Cumming, GA (US); Satish B. Menon, Alpharetta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 283 days.

(21) Appl. No.: 13/708,402

(22) Filed: Dec. 7, 2012

(65) Prior Publication Data

US 2013/0151373 A1 Jun. 13, 2013

Related U.S. Application Data

(60) Provisional application No. 61/568,229, filed on Dec. 8, 2011.

(51) Int. Cl.
*G06Q 99/00* (2006.01)
*G06Q 30/06* (2012.01)
(Continued)

(52) U.S. Cl.
CPC ............ *G06Q 30/0607* (2013.01); *G06Q 10/08* (2013.01); *G06Q 50/28* (2013.01); *G06Q 10/0832* (2013.01); *G06Q 20/4016* (2013.01)
USPC ............................................ 705/50; 705/317

(58) Field of Classification Search
CPC .............. G06Q 30/0607; G06Q 50/28; G06Q 20/4016; G06Q 10/08; G06Q 10/0832
USPC .................................................. 705/50, 317
See application file for complete search history.

(56) References Cited

U.S. PATENT DOCUMENTS 7,020,634 B2 * 3/2006 Khaishgi et al. ................ 705/50
7,054,844 B2 * 5/2006 Fletcher et al. ................. 705/75
(Continued)

OTHER PUBLICATIONS

International Preliminary Examining Authority, International Preliminary Report on Patentability for International Application No. PCT/US2012/068468, mailed Dec. 20, 2013, 43 pages, United States Patent and Trademark Office, USA.

(Continued)

*Primary Examiner* — James D Nigh
(74) *Attorney, Agent, or Firm* — Alston & Bird LLP

(57) ABSTRACT

Systems and methods for supporting regulatory requirements for the distribution of controlled and non-controlled items such as, for example, non-controlled prescriptions (Rx), medical devices, and controlled substances in countries such as the United States and Canada, are provided. The systems and methods incorporate a license verification module that is configured to perform license validation for a particular order placed for a controlled and/or non-controlled item. In certain embodiments, the license verification module compares order data to historically sorted data and if one or more discrepancies exist, validation is unsuccessful. The license verification module may further query a third party database for updated license information upon validation failure. The systems and methods further incorporate a suspicious order monitoring module that is configured to perform a plurality of checks on the order to identify the order as an "order of interest" that may be further investigated and deemed to be suspicious.

22 Claims, 12 Drawing Sheets

(51) Int. Cl.
  *G06Q 10/08* (2012.01)
  *G06Q 50/28* (2012.01)
  *G06Q 20/40* (2012.01)

(56) References Cited

U.S. PATENT DOCUMENTS

| | | | |
|---|---|---|---|
| 2001/0042050 A1* | 11/2001 | Fletcher et al. | 705/64 |
| 2002/0042762 A1* | 4/2002 | McQuade et al. | 705/29 |
| 2002/0120573 A1 | 8/2002 | McCormick | |
| 2008/0004966 A1* | 1/2008 | Singleton et al. | 705/21 |
| 2010/0030653 A1 | 2/2010 | Westphal | |
| 2011/0196804 A1 | 8/2011 | Sutter et al. | |
| 2011/0218928 A1* | 9/2011 | Refior et al. | 705/310 |
| 2011/0238593 A1 | 9/2011 | Hearnes, II et al. | |

OTHER PUBLICATIONS

International Preliminary Examining Authority, International Preliminary Report and Written Opinion for International Application No. PCT/US2012/068468, mailed Apr. 2, 2013, 20 pages, United States Patent and Trademark Office, USA.

* cited by examiner

SYSTEMS AND METHODS FOR SUPPORTING REGULATORY REQUIREMENTS FOR THE DISTRIBUTION OF CONTROLLED AND NON-CONTROLLED ITEMS

CROSS-REFERENCE TO RELATED APPLICATIONS

This application claims priority to and the benefit of U.S. Application Ser. No. 61/568,229, filed Dec. 8, 2011, which is hereby incorporated herein in its entirety.

BACKGROUND OF THE INVENTION

1. Field of the Invention

Various embodiments of the disclosed invention generally relate to systems and methods for supporting regulatory requirements for the distribution of controlled and non-controlled items such as, for example, non-controlled prescriptions (Rx), medical devices, and controlled substances in countries such as the United States and Canada.

2. Description of Related Art

In the United States, distributors of controlled substances are required to be registered by the Drug Enforcement Administration (DEA). A controlled substance is generally understood to be a drug or chemical substance whose possession and use are regulated under the United States' Controlled Substances Act, such as, for instance, many prescription medications and narcotic drugs. Under federal regulations, registered distributors must accurately verify customer licenses and also design and operate a system to identify and report suspicious orders of controlled substances. Suspicious orders may include non-limiting examples such as orders of unusual size, orders deviating substantially from a normal pattern, orders of unusual frequency, and the like. Failure to effectively verify licenses and to diligently minimize the occurrence of suspicious order approvals may result in fines and/or loss of privilege to ship such substances.

In the past, drug distributors have instituted various stand-alone applications designed to verify license data and/or identify suspicious orders. With regard to the latter, a simple, threshold-based calculation is applied in many instances. For example, a customer may be assigned a monthly threshold for each family of controlled substances and if the customer attempts to place an order that exceeds its monthly threshold, the order is flagged as suspicious. However, such approaches simply set a number value that does not typically automatically adjust over time as customer patterns evolve. Further, such approaches do not consider other customers or clients of the same type who may be placing orders for controlled substances within the same family. Such systems oftentimes do not concurrently verify license status at the time of evaluating an order's suspicious nature. As a result, a customer's license may not be valid, or their predetermined threshold may not be as accurate or up to date, as viewed across a broader sample of customers over time.

Therefore, a need exists for an improved system and method for verifying license data and identifying suspicious orders for a customer in which the system and method automatically check license data and account for historical order information across a broad sampling of customers and clients.

BRIEF SUMMARY

According to various embodiments of the present invention, a regulatory and compliance system is provided for identifying verifying customer license data received with orders for regulated substances. The system comprises one or more memory storage areas containing stored data related to one or more parameters associated with a plurality of customer regulatory licenses; and one or more computer processors. The one or more computer processors are configured to: (A) receive an order for a regulated substance from a customer, the order comprising order data comprising customer input data related to the one or more parameters associated with one of the plurality of customer regulatory licenses associated with the customer; (B) retrieve at least a portion of the stored data contained in the one or more memory storage areas; (C) compare the customer input data and the retrieved portion of the stored data to identify one or more discrepancies; (D) in response to identifying no discrepancies, generate a successful validation report for the order, the successful validation report approving further processing of the order; and (E) in response to identifying one or more discrepancies, generate an unsuccessful validation report for the order.

According to various embodiments of the present invention, a computer-implemented method is provided for license verification related to orders of one or more regulated substances. Various embodiments of the method comprise the steps of: (A) receiving and storing, within one or more memory storage areas, order data associated with an order for a regulated substance placed by a customer, the order data comprising customer input data related to the one or more parameters associated with one of the plurality of customer licenses associated with the customer; (B) retrieving from the one or more memory storage areas at least a portion of stored data, the stored data comprising data related to one or more parameters associated with a plurality of customer regulatory licenses; (C) comparing, via at least one computer processor, the customer input data and the retrieved portion of the stored data to identify one or more discrepancies; (D) in response to identifying no discrepancies, generating, via the at least one computer processor, a successful validation report for the order, the successful validation report approving further processing of the order; and (E) in response to identifying one or more discrepancies, generating, via the at least one computer processor, an unsuccessful validation report for the order, the unsuccessful validation report preventing further processing of the order.

According to various embodiments of the present invention, a computer program product is provided comprising at least one computer-readable storage medium having computer-readable program code portions embodied therein. The computer-readable program code portions comprise a first executable portion configured for receiving data associated with a customer license received with an order for regulated substances; a second executable portion configured for comparing the customer input data and at least a portion of the stored data to identify one or more discrepancies; and a third executable portion configured for generating one or more reports based upon the comparison. The data associated with the customer license that is received by the first executable portion comprises order data associated with an order for a regulated substance placed by a customer, the order data comprising customer input data related to the one or more parameters associated with one of the plurality of customer licenses associated with the customer; and stored data, the stored data comprising data related to one or more parameters associated with a plurality of customer regulatory licenses. The third executable portion is further specifically configured to: in response to identifying no discrepancies, to generate a successful validation report for the order, the successful validation report approving further processing of the order; and in response to identifying one or more discrepancies, to generate an unsuccessful validation report for the order, the unsuccessful validation report preventing further processing of the order.

According to various embodiments of the present invention, a regulatory and compliance system is provided for identifying suspicious orders received for regulated substances. The system comprises a memory and one or more processors. The one or more processors are configured to: receive an order for a regulated substance from a customer, the order comprising an order quantity, an order date, a customer identifier identifying the customer, a customer type identifier identifying a type of customer, and a substance identifier identifying the regulated substance; query historical orders from the memory comprising a historical substance identifier that matches the substance identifier, each historical order comprising a historical quantity, a ship date identifying the date the order was shipped, a historical customer identifier identifying a customer who placed the order, and a historical customer type identifier identifying the type of customer; apply checks to the order; and in response to the order being marked as suspicious, store information associated with the order in the memory to facilitate further investigation. The checks applied to the order comprise: (1) determining whether the order quantity is greater than a first upper control limit value, the first upper control limit value being derived from the historical quantities for a first subset of the historical orders, the first subset of the historical orders comprising the historical orders with the historical customer identifiers that match the customer identifier, and in response to the order quantity being greater than the first upper control limit value, marking the order as suspicious; (2) calculating a period of time between the order date for the order and the ship date for a previous consecutive historical order from the historical orders with the historical customer identifier that matches the customer identifier, determining whether the order quantity is greater than a second upper control limit value, the second upper control limit value being derived from the period of time and the historical quantities for a second subset of the historical orders, the second subset of the historical orders comprising the historical orders with the historical customer identifiers that match the customer identifier, and in response to the order quantity being greater than the second upper control limit value, marking the order as suspicious; (3) determining whether the order quantity is greater than a first threshold value, the first threshold value being derived from the historical quantities for a third subset of the historical orders, the third subset of the historical orders comprising the historical orders with the historical customer type identifiers that match the customer type identifier, and in response to the order quantity being greater than the first threshold value, marking the order as suspicious; (4) determining whether the order quantity is greater than a second threshold value, the second threshold value being derived from the historical quantities of the historical orders, and in response to the order quantity being greater than the second threshold value, marking the order as suspicious; and (5) determining whether the order quantity is greater than a third threshold value, the third threshold value being derived from the historical quantities for a fourth subset of the historical orders, the fourth subset of the historical orders comprising the historical orders with the historical customer and client identifiers that match the customer and client identifiers, and in response to the order quantity being greater than the third threshold value, marking the order as suspicious.

According to various embodiments of the present invention, a computer-implemented method is provided for identifying suspicious orders received for regulated substances. Various embodiments of the method comprise the steps of: receiving an order for a regulated substance from a customer, the order comprising an order quantity, an order date, a customer identifier identifying the customer, a customer type identifier identifying a type of customer, and a substance identifier identifying the regulated substance; querying historical orders from memory comprising a historical substance identifier that matches the substance identifier, each historical order comprising a historical quantity, a ship date identifying the date the order was shipped, a historical customer identifier identifying a customer who placed the order, and a historical customer type identifier identifying the type of customer; applying checks to the order via a computer device, the checks comprising: (1) the computer device determining whether the order quantity is greater than a first upper control limit value, the first upper control limit value being derived from the historical quantities for a first subset of the historical orders, the first subset of the historical orders comprising the historical orders with the historical customer identifiers that match the customer identifier, and in response to the order quantity being greater than the first upper control limit value, marking the order as suspicious; (2) the computer device calculating a period of time between the order date for the order and the ship date for a previous consecutive historical order from the historical orders with the historical customer identifier that matches the customer identifier, determining whether the order quantity is greater than a second upper control limit value, the second upper control limit value being derived from the period of time and the historical quantities for a second subset of the historical orders, the second subset of the historical orders comprising the historical orders with the historical customer identifiers that match the customer identifier, and in response to the order quantity being greater than the second upper control limit value, marking the order as suspicious; (3) the computer device determining whether the order quantity is greater than a first threshold value, the first threshold value being derived from the historical quantities for a third subset of the historical orders, the third subset of the historical orders comprising the historical orders with the historical customer type identifiers that match the customer type identifier, and in response to the order quantity being greater than the first threshold value, marking the order as suspicious; (4) the computer device determining whether the order quantity is greater than a second threshold value, the second threshold value is derived from the historical quantities of the historical orders, and in response to the order quantity being greater than the second threshold value, marking the order as suspicious; and (5) the computer device determining whether the order quantity is greater than a third threshold value, the third threshold value being derived from the historical quantities for a fourth subset of the historical orders, the fourth subset of the historical orders comprising the historical orders with the historical customer and client identifiers that match the customer and client identifiers, and in response to the order quantity being greater than the third threshold value, marking the order as suspicious; and in response to the order being marked as suspicious, storing information associated with the order in the memory to facilitate further investigation.

According to various embodiments of the present invention, a computer program product is provided comprising at least one computer-readable storage medium having computer-readable program code portions embodied therein. The computer-readable program code portions comprise: a first executable portion configured to receive an order for a regulated substance from a customer, the order comprising an order quantity, an order date, a customer identifier identifying the customer, a customer type identifier identifying a type of customer, and a substance identifier identifying the regulated substance; a second executable portion configured to query historical orders comprising a historical substance identifier that matches the substance identifier, each historical order comprising a historical quantity, a ship date identifying the date the order was shipped, a historical customer identifier identifying a customer who placed the order, and a historical customer type identifier identifying the type of customer; a third executable portion configured to apply checks to the order, the checks comprising: (1) determining whether the order quantity is greater than a first upper control limit value, the first upper control limit value being derived from the historical quantities for a first subset of the historical orders, the first subset of the historical orders comprising the historical orders with the historical customer identifiers that match the customer identifier, and in response to the order quantity being greater than the first upper control limit value, marking the order as suspicious; (2) calculating a period of time between the order date for the order and the ship date for a previous consecutive historical order from the historical orders with the historical customer identifier that matches the customer identifier, determining whether the order quantity is greater than a second upper control limit value, the second upper control limit value being derived from the period of time and the historical quantities for a second subset of the historical orders, the second subset of the historical orders comprising the historical orders with the historical customer identifiers that match the customer identifier, and in response to the order quantity being greater than the second upper control limit value, marking the order as suspicious; (3) determining whether the order quantity is greater than a first threshold value, the first threshold value being derived from the historical quantities for a third subset of the historical orders, the third subset of the historical orders comprising the historical orders with the historical customer type identifiers that match the customer type identifier, and in response to the order quantity being greater than the first threshold value, marking the order as suspicious; (4) determining whether the order quantity is greater than a second threshold value, the second threshold value is derived from the historical quantities of the historical orders, and in response to the order quantity being greater than the second threshold value, marking the order as suspicious; and (5) determining whether the order quantity is greater than a third threshold value, the third threshold value being derived from the historical quantities for a fourth subset of the historical orders, the fourth subset of the historical orders comprising the historical orders with the historical customer and client identifiers that match the customer and client identifiers, and in response to the order quantity being greater than the third threshold value, marking the order as suspicious; and in response to the order being marked as suspicious, a fourth executable portion configured to store information associated with the order in the memory to facilitate further investigation.

BRIEF DESCRIPTION OF THE SEVERAL VIEWS OF THE DRAWING(S)

Reference will now be made to the accompanying drawings, which are not necessarily drawn to scale, and wherein.

Figure 6:
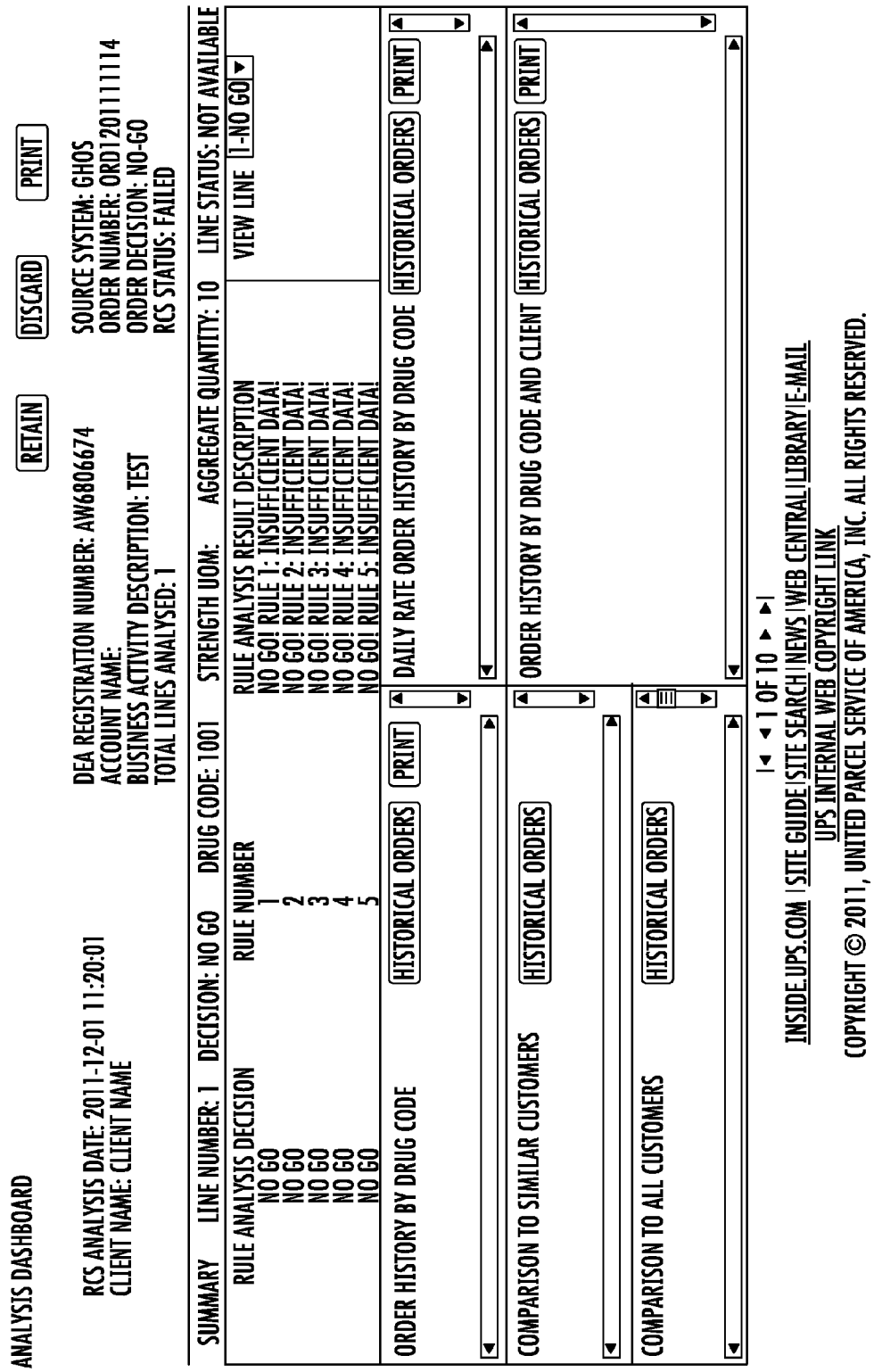
Figure 7:
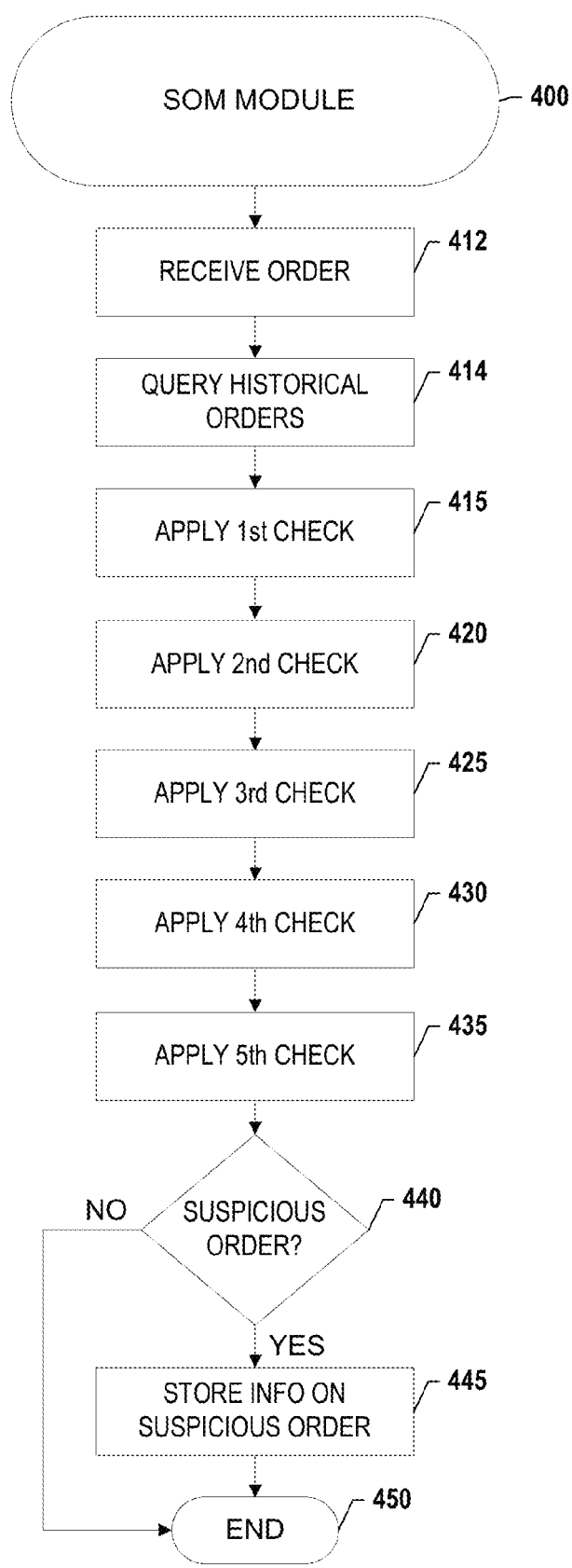
Figure 8:
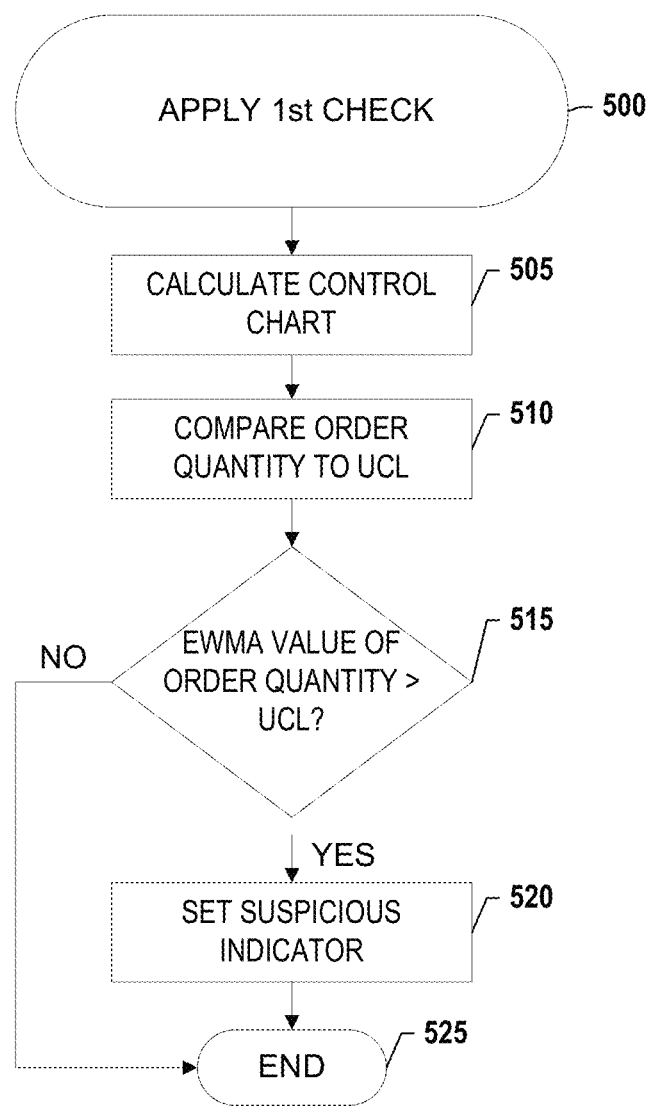
Figure 9:
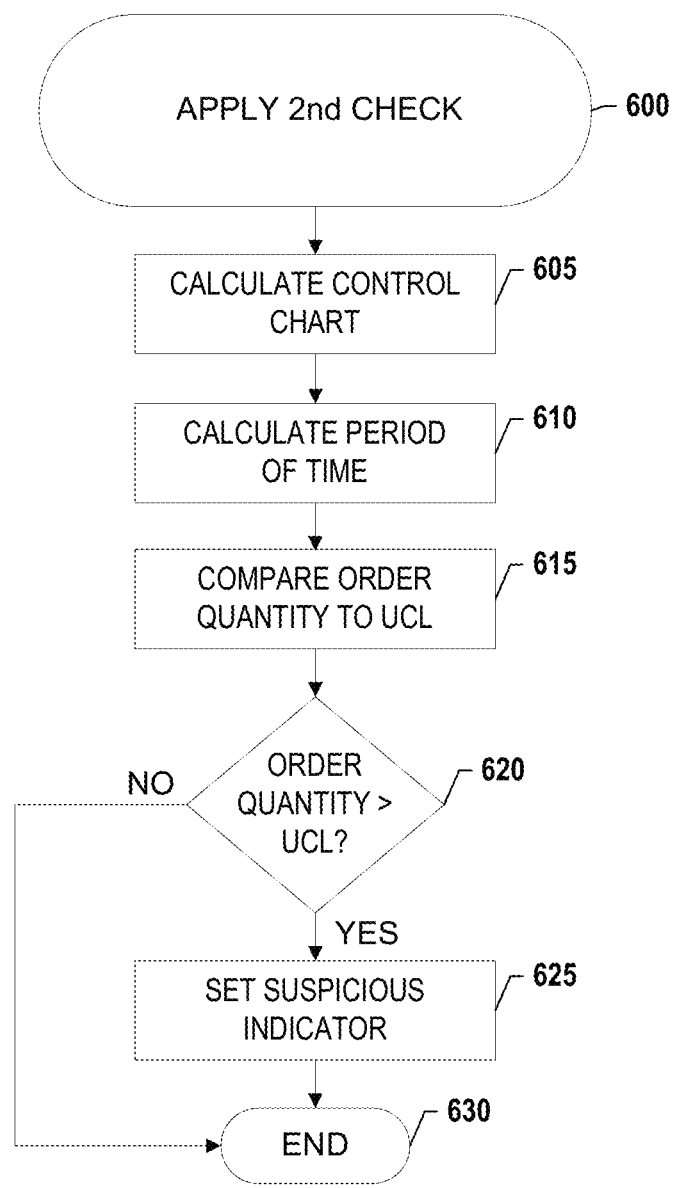
Figure 10:
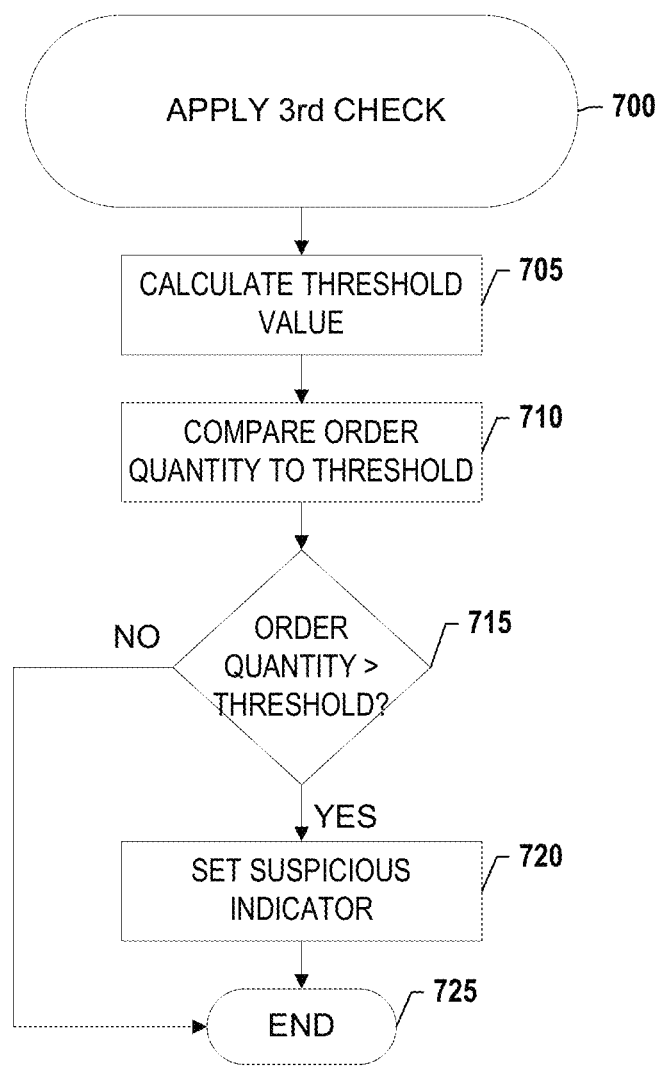
Figure 11:
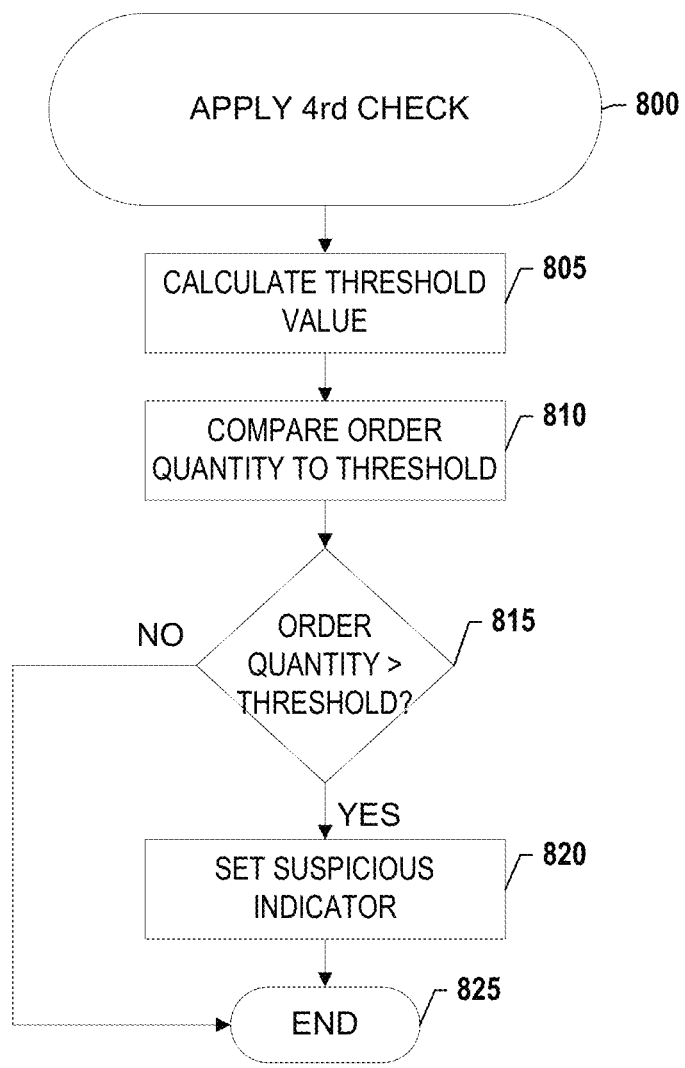
Figure 12:
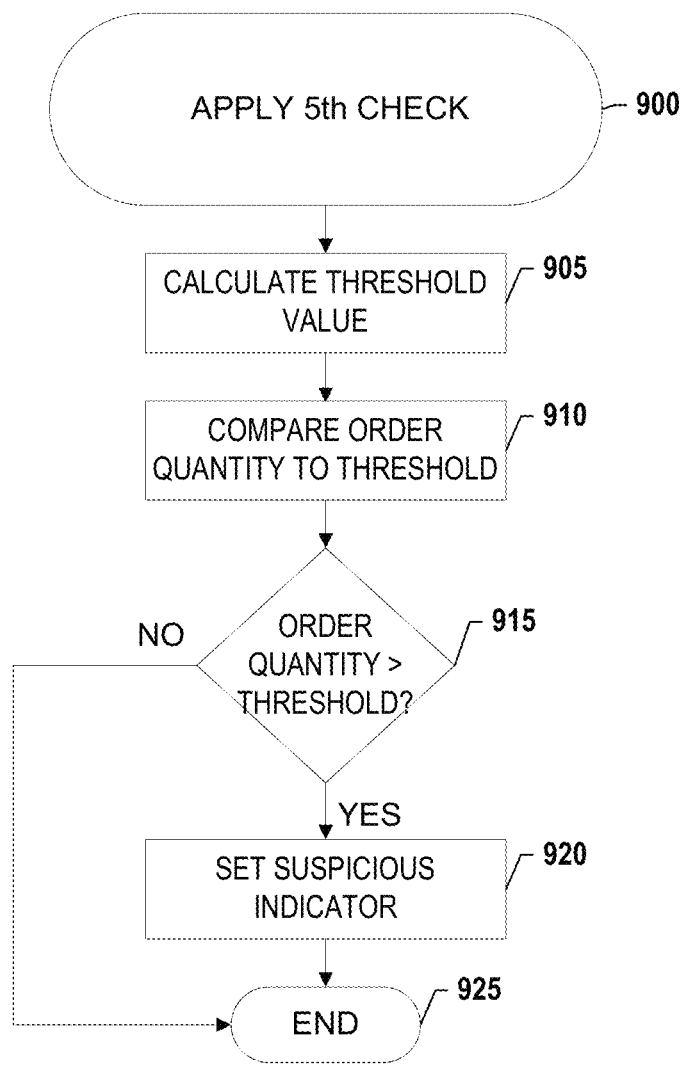

FIG. 6 provides an example of a user interface provided according to various embodiments;

FIG. 7 shows a flow diagram of an exemplary suspicious order monitoring module according to various embodiments;

FIG. 8 shows a flow diagram of the suspicious order monitoring module applying a first check according to various embodiments;

FIG. 9 shows a flow diagram of the suspicious order monitoring module applying a second check according to various embodiments;

FIG. 10 shows a flow diagram of the suspicious order monitoring module applying a third check according to various embodiments;

FIG. 11 shows a flow diagram of the suspicious order monitoring module applying a fourth check according to various embodiments; and FIG. 12 shows a flow diagram of the suspicious order monitoring module applying a fifth check according to various embodiments.

DETAILED DESCRIPTION OF VARIOUS EMBODIMENTS

Various embodiments of the present invention will now be described more fully hereinafter with reference to the accompanying drawings, in which some, but not all embodiments of the inventions are shown. Indeed, these embodiments may be embodied in many different forms and should not be construed as limited to the embodiments set forth herein; rather, these embodiments are provided so that this disclosure will satisfy applicable legal requirements. Unless otherwise defined, all technical and scientific terms used herein have the same meaning as commonly known and understood by one of ordinary skill in the art to which the invention relates. The term "or" is used herein in both the alternative and conjunctive sense, unless otherwise indicated. Like numbers refer to like elements throughout.

I. Methods, Apparatus, Systems, and Computer Program Products

As should be appreciated, the embodiments may be implemented in various ways, including as methods, apparatus, systems, or computer program products. Accordingly, the embodiments may take the form of an entirely hardware embodiment or an embodiment in which a processor is programmed to perform certain steps. Furthermore, the various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

Particular embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

II. Exemplary System Architecture

Figure 1:
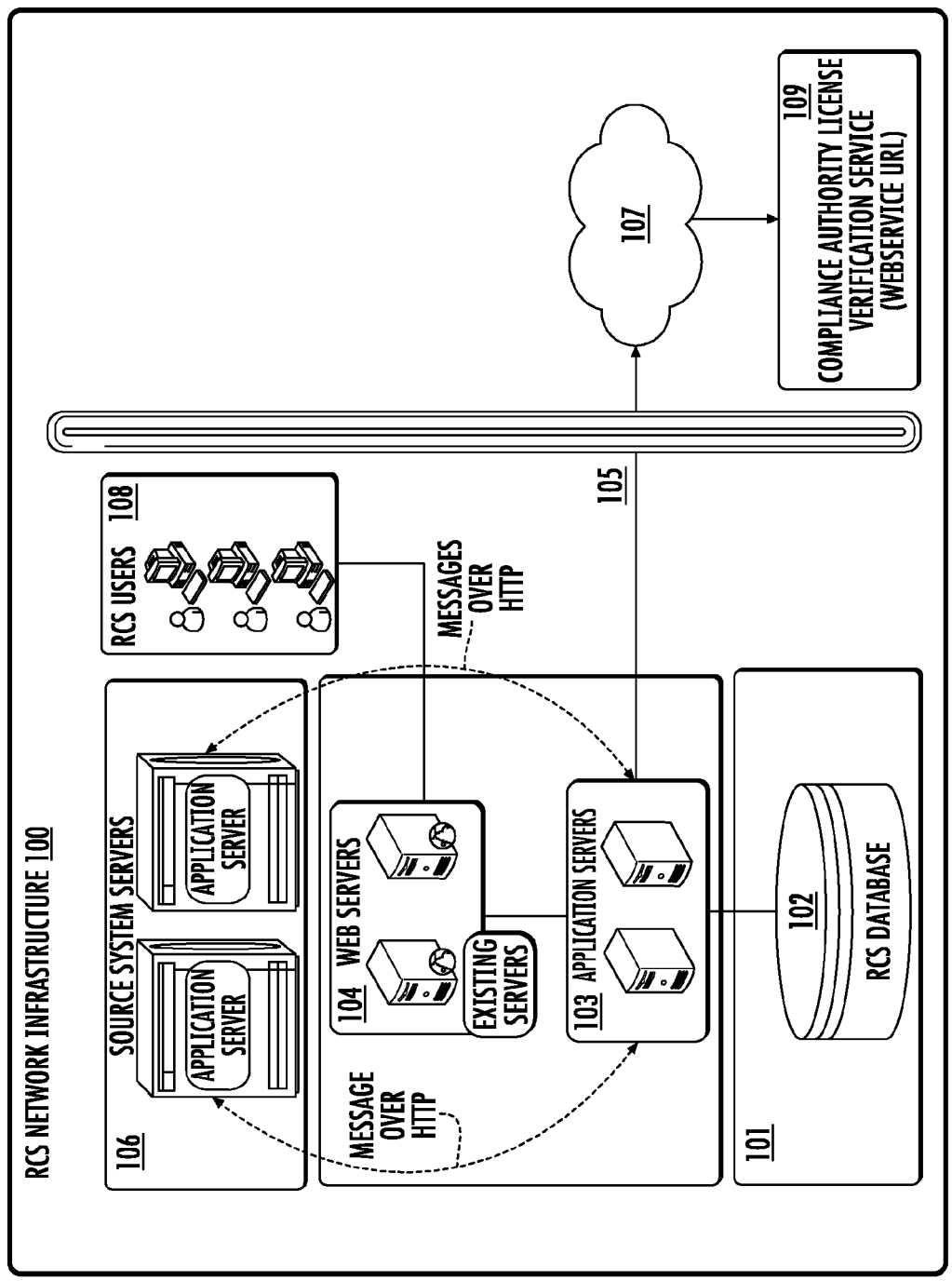
FIG. 1 shows an overview of various embodiments of a system architecture that can be used to practice aspects of the present invention.

FIG. 1 provides an illustration of a regulatory and compliance (RCS) network infrastructure 100 that can be used in conjunction with various embodiments of the present invention. According to various embodiments, the RCS network infrastructure 100 may be associated with a manufacturer and/or distributor of controlled and/or non-controlled items such as, for example, non-controlled prescriptions (Rx), medical devices, and/or controlled substances. In other embodiments, the RCS network infrastructure 100 may be associated with a carrier used by the manufacturer and/or distributor to ship such items. For instance, a manufacturer may contract with a carrier (such as the non-limiting example of United Parcel Service) to serve as a warehousing facility and/or distribution facility for the manufacturer. In this particular instance, the carrier may store the manufacturer's inventory of controlled and/or non-controlled items, may receive orders from customers, may process the orders, and/or may ship portions of the inventory to the customers to fulfill the orders. In still other embodiments, the carrier and manufacturer and/or distributor may collectively share various responsibilities, in which case the RCS network infrastructure 100 may be at least partially distributed in nature.

In FIG. 1, the RCS network infrastructure 100 may include a collection of services such as web services, database operations and services, and services used to process orders received for controlled and/or non-controlled items. In certain embodiments, these services may be provided within the RCS network infrastructure 100 by one or more sub-systems residing within the infrastructure 100. As a non-limiting example, the RCS network infrastructure 100 shown in FIG. 1 includes database services 101, storage media 102, web servers 104, order services (not pictured), and application servers 103. In various embodiments, the database services 101 may comprise a database management system, and the storage media 102 may comprise one or more databases and one or more database instances. In various embodiments, the storage media 102 may be one or more types of medium such as hard disks, magnetic tapes, or flash memory. The term "database" refers to a structured collection of records or data that is stored in a computer system, such as via a relational database, hierarchical database, or network database. For example, in one embodiment, the storage media 102 includes at least one database that stores historical information on orders received and shipped for non-controlled and controlled items.

In various embodiments, the web servers 104 and application servers 103 are configured to provide data to various source systems 106, which may wish to access various services within the RCS network infrastructure 100 and/or to place or review orders for non-controlled and controlled items such as non-controlled prescriptions (Rx), medical devices, and/or controlled substances. The web servers 104 and application servers 103 may also, in certain embodiments, be configured to provide data to third-party entities (e.g., their associated frameworks and systems), such as a compliance authority 109, for example, to gather information. For instance, the web services 104 may exchange data with the source systems 106 and compliance authority. Thus, in various embodiments, the web services 104 include the hardware, operating system, web server software, TCP/IP protocols, and site content (web pages, images and other files). Thus, for example, the source systems 106 may access data delivered by the web services 104 and may place a request with the infrastructure 100. Further, in various embodiments, a user may access one or more web pages to review information on orders.

In the embodiment of the RCS network infrastructure 100 shown in FIG. 1, the web services 104 communicate over a network 107 (such as the Internet) with the source systems 106. The source systems 106 may interface with the web services 104. Furthermore, as explained in more detail below, the web services 104 may also communicate with other externals systems such as a third-party compliance authority's system 109.

In addition, in various embodiments, the web services 104 communicate over a network 105 within the system 100 (or over an external network 107) with a RCS user's computing device 108. Similar to the source systems 106, the user's computing device 108 (e.g., a desktop computer, notebook or laptop, personal digital assistant (PDA), cell phone, or other processing devices) may interface with the web services 104 using a browser residing on the user's computing device 108.

Further, in various embodiments, the application servers 103 include applications that are used to provide functionality within the RCS network infrastructure 100. For instance, in one embodiment, the application servers 103 are made up of one or more servers and include a regulatory and compliance system (RCS) application. In this particular embodiment, the RCS application provides functionality to verify licenses and to identify suspicious orders placed for controlled and/or non-controlled items such as, for example, non-controlled prescriptions (Rx), medical devices, and/or controlled substances. In addition, these services/servers 101, 103, 104, 110 and storage media 102 may also be in electronic communication with one another within the RCS network infrastructure 100. For instance, these services/servers 101, 103, 104, 110 and storage media 102 may be in communication over the same or different wireless or wired networks 105 including, for example, a wired or wireless Personal Area Network ("PAN"), Local Area Network ("LAN"), Metropolitan Area Network ("MAN"), Wide Area Network ("WAN"), the Internet, or the like. Finally, while FIGS. 1 illustrates the components of the RCS network infrastructure 100 as separate, standalone entities, the various embodiments of the RCS network infrastructure 100 are not limited to this particular architecture.

a. Application Server

Figure 2:
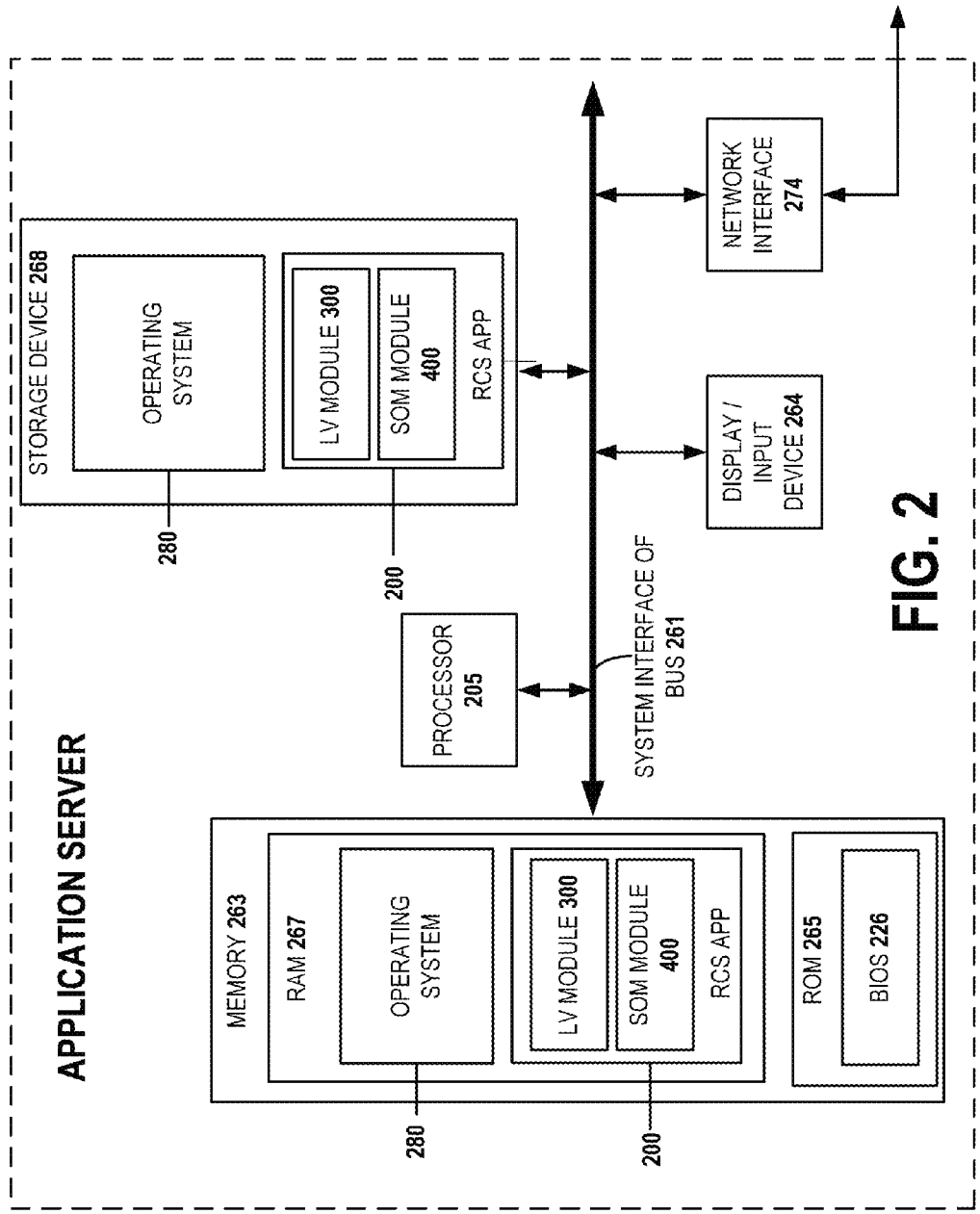
FIG. 2 shows an exemplary schematic diagram of an application server according to various embodiments.

FIG. 2 provides a schematic of an application server that may be part of the application services 103 according to one embodiment of the present invention. As will be understood from this figure, in this embodiment, the application server includes a processor 205 that communicates with other elements within the application server via a system interface or bus 261. The processor 205 may be embodied in a number of different ways. For example, the processor 205 may be embodied as various processing means such as a processing element, a microprocessor, a coprocessor, a controller or various other processing devices including integrated circuits such as, for example, an application specific integrated circuit ("ASIC"), a field programmable gate array ("FPGA"), a hardware accelerator, or the like. In an exemplary embodiment, the processor 205 may be configured to execute instructions stored in the device memory or otherwise accessible to the processor 205. As such, whether configured by hardware or software methods, or by a combination thereof, the processor 205 may represent an entity capable of performing operations according to embodiments of the present invention while configured accordingly. A display device/input device 264 for receiving and displaying data is also included in the application server. This display device/input device 264 may be, for example, a keyboard or pointing device that is used in combination with a monitor. The application server further includes memory 263, which may include both read only memory ("ROM") 265 and random access memory ("RAM") 267. The application server's ROM 265 may be used to store a basic input/output system ("BIOS") 226 containing the basic routines that help to transfer information to the different elements within the application server.

In addition, in one embodiment, the application server includes at least one storage device 268, such as a hard disk drive, a CD drive, and/or an optical disk drive for storing information on various computer-readable media. The storage device(s) 268 and its associated computer-readable media may provide nonvolatile storage. The computer-readable media described above could be replaced by any other type of computer-readable media, such as embedded or removable multimedia memory cards ("MMCs"), secure digital ("SD") memory cards, Memory Sticks, electrically erasable programmable read-only memory ("EEPROM"), flash memory, hard disk, or the like. Additionally, each of these storage devices 268 may be connected to the system bus 261 by an appropriate interface.

Furthermore, a number of program applications (e.g., set of computer program instructions) may be stored by the various storage devices 268 and/or within RAM 267. Such program applications may include an operating system 280 and a RCS application 300. This application 200 may control certain aspects of the operation of the application server with the assistance of the processor 205 and operating system 280. Furthermore, the RCS application 200 may include one or more modules for performing specific operations associated with the application 200, although its functionality need not be modularized. For instance, in particular embodiments, the RCS application 200 includes a license verification (LV) module 300 and a suspicious order monitoring (SOM) module 400. As described in greater detail below, the LV module 300 verifies inbound/outbound transactions containing controlled and/or non-controlled items for a valid license such as, for example, a DEA registration, DEA listed chemical registration, FDA registration and state controlled substances license, state license, Health Canada Office of Controlled Substances license, and/or precursor license. The SOM module 400 provides functionality to detect suspicious orders placed for controlled and/or non-controlled items.

Also located within the application server, in one embodiment, is a network interface 274 for interfacing with various computing entities, such as the web services 104, database services 101, order services 110, and/or storage media 102. This communication may be via the same or different wired or wireless networks (or a combination of wired and wireless networks), as discussed above. For instance, the communication may be executed using a wired data transmission protocol, such as fiber distributed data interface ("FDDI"), digital subscriber line ("DSL"), Ethernet, asynchronous transfer mode ("ATM"), frame relay, data over cable service interface specification ("DOCSIS"), or any other wired transmission protocol. Similarly, the application server may be configured to communicate via wireless external communication networks using any of a variety of protocols, such as 802.11, general packet radio service ("GPRS"), wideband code division multiple access ("W-CDMA"), or any other wireless protocol.

It will be appreciated that one or more of the application server's components may be located remotely from other application server components. Furthermore, one or more of the components may be combined and additional components performing functions described herein may be included in the application server.

b. Additional Exemplary System Components

The database services 101, the order services 110, and the web services 104 may each include components and functionality similar to that of the application services 103. For example, in one embodiment, each of these entities may include: (1) a processor that communicates with other elements via a system interface or bus; (2) a display device/input device; (3) memory including both ROM and RAM; (4) a storage device; and (5) a network interface. Thus, these architectures are provided for exemplary purposes only and are not limiting to the various embodiments. The terms "computing device" and "computer device" are used generically to refer to any computer, computing device, desktop, notebook or laptop, distributed system, server, gateway, switch, or other processing device adapted to perform the functions described herein.

III. Exemplary System Operation

Figure 3:
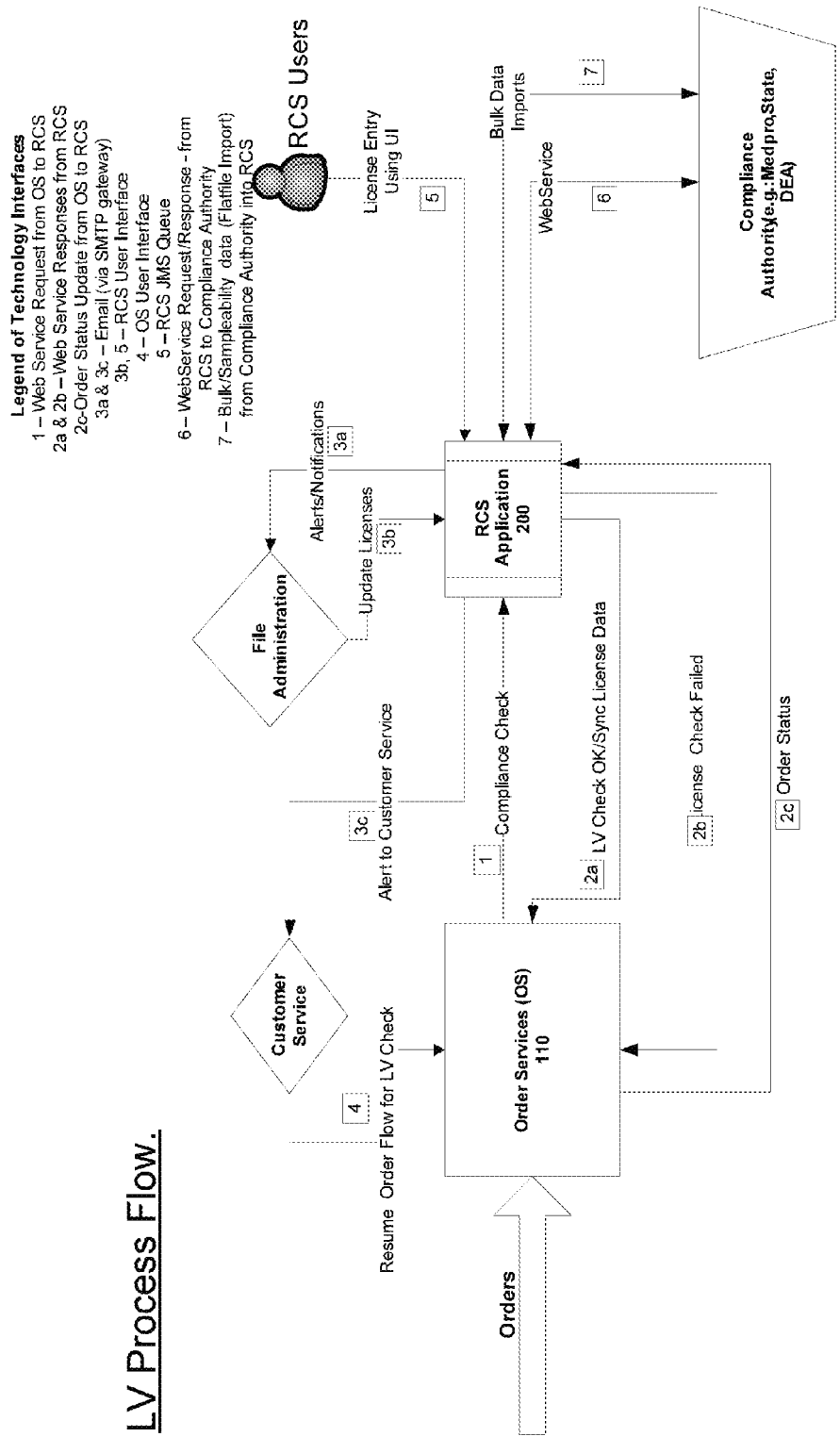
FIG. 3 shows a process flow for a license validation according to various embodiments.
Figure 4:
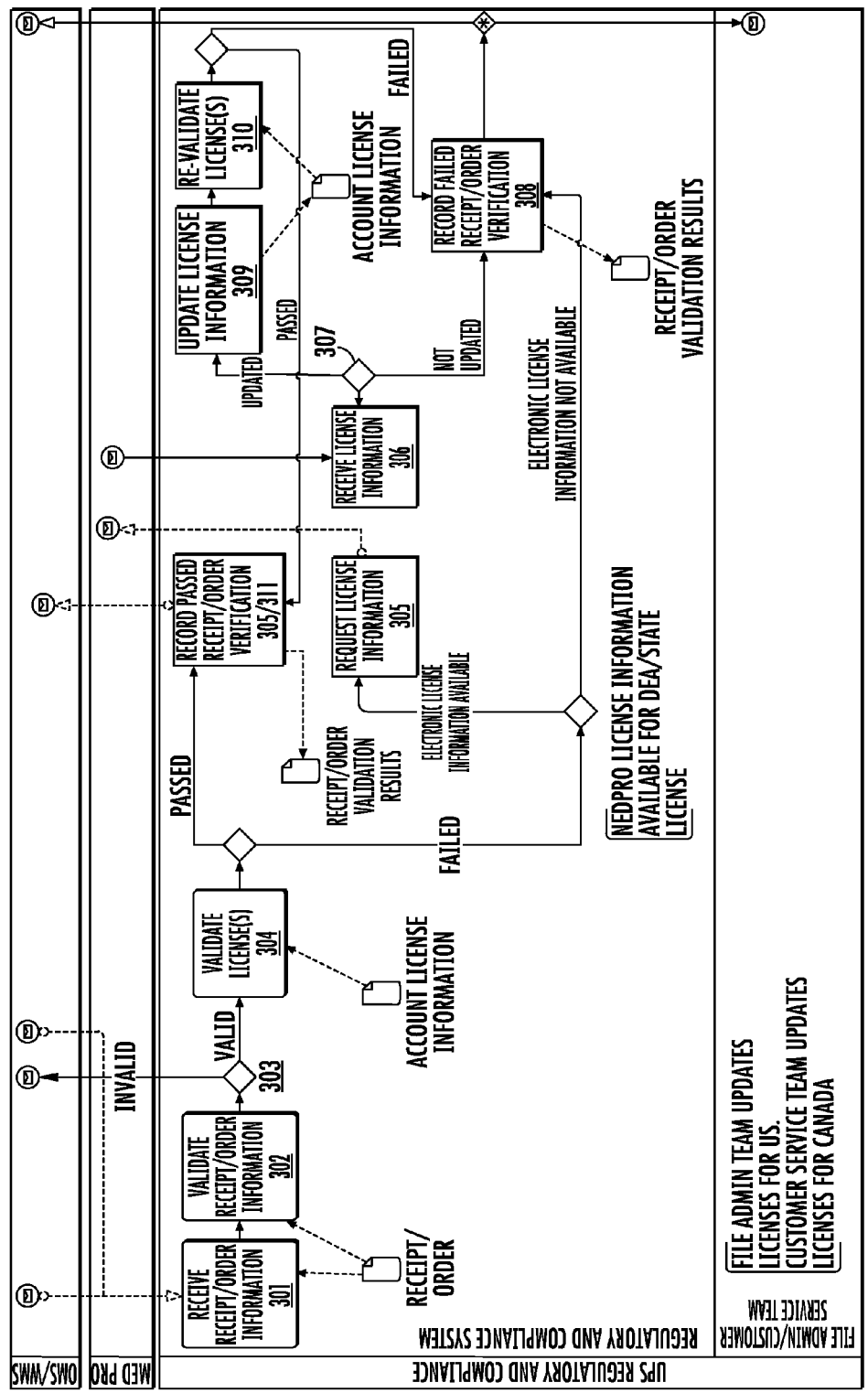
FIG. 4 shows a flow diagram of a license validation module according to various embodiments.
Figure 5:
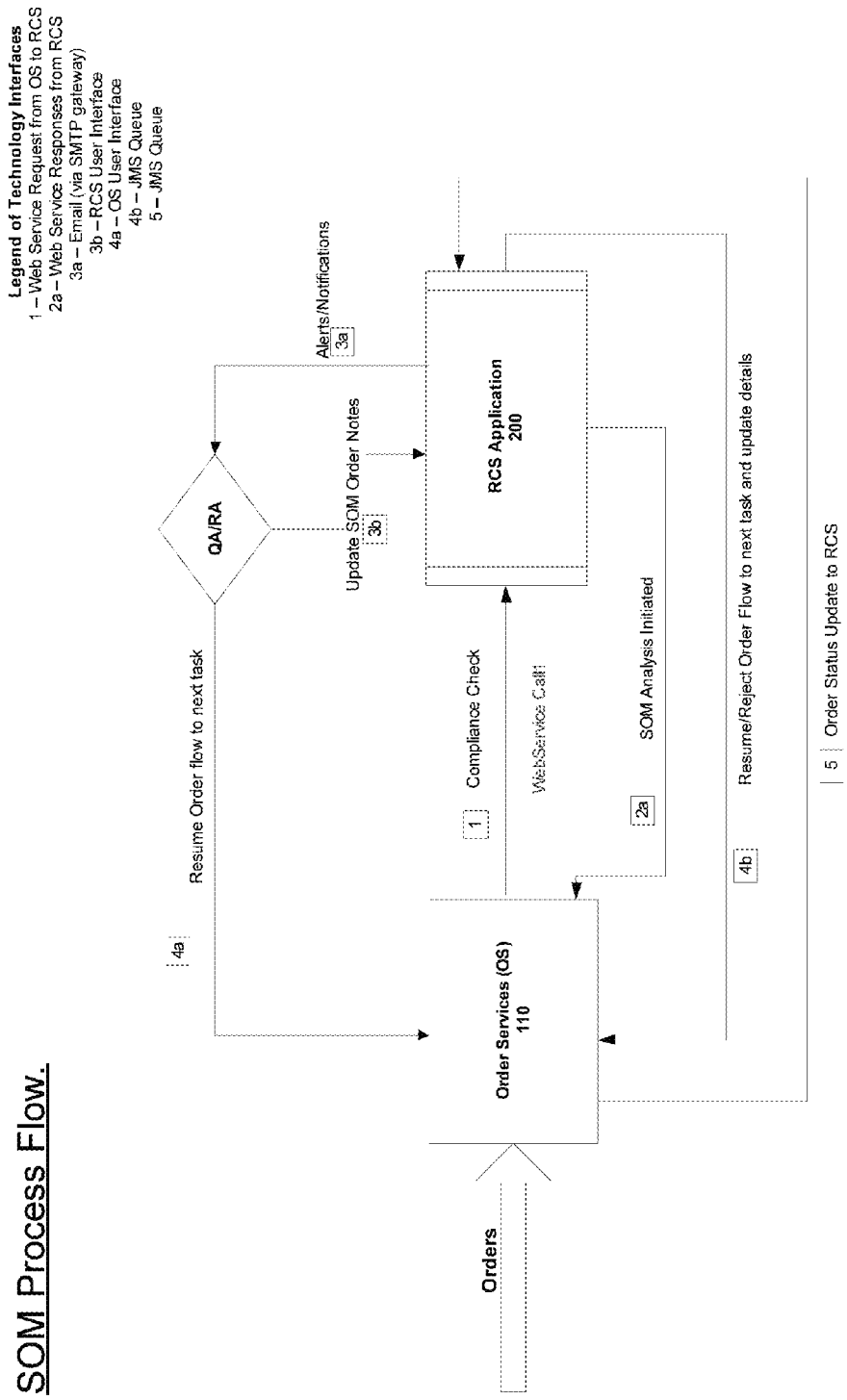
FIG. 5 shows a process flow for suspicious order monitoring according to various embodiments.

As noted above, various embodiments of the present invention provide systems and methods for verifying inbound/outbound transactions containing controlled and/or non-controlled items against a valid license and for identifying suspicious orders placed for controlled and/or non-controlled items. Reference will now be made to FIGS. 3-5 and 7-12, which illustrate operations and processes as produced by these various embodiments. For instance, FIG. 3 provides a process flow for a license validation according to an embodiment of the invention. FIG. 4 provides a flow diagram of a license verification (LV) module 300 that perform license validation for a particular order placed for a controlled and/or non-controlled item. FIG. 5 provides a flow diagram of a suspicious order monitoring (SOM) module 400 that performs checks on an order placed for a controlled and/or non-controlled item to determine whether the order should be identified as suspicious. That is, in various embodiments, the SOM module 400 performs checks on the order to identify the order as an "order of interest" that may be further investigated and deemed to be suspicious. FIGS. 7-12 provide additional details regarding operation of the SOM module. The RCS application 200 and corresponding modules 300, 400 are described in greater detail below.

a. LV Module

As previously discussed, in various embodiments, the RCS application 200 may include a LV module 300. FIG. 3 provides a process flow for verifying license information needed for placing an order for outbound shipments or receiving inbound shipments for particular controlled and/or non-controlled items. In this particular instance, a distributor receives an order for a controlled or non-controlled item such as a non-controlled prescription (Rx), medical device, and/or controlled substance. For example, in one embodiment, the distributor's infrastructure 100 is in direct communication with a source system 106. For example, the customer may send the distributor an email or the customer's system 106 and the distributor's infrastructure 100 may exchange information via electronic data interchange (EDI) over a closed network.

In another embodiment, the customer may enter the order on a web site. In this particular embodiment, the customer visits the web site over the Internet 107 and enters the order via one or more web pages. That is, in various embodiments, web servers 104 located within the distributor's infrastructure 100 provide an interface (e.g., one or more web pages) that is configured to allow the customer to enter the order for the controlled and/or non-controlled item.

The customer placing the order may provide several pieces of information according to embodiments. For example, the customer may provide an identifier for the controlled and/or non-controlled item, such as a Drug Enforcement Administration (DEA) drug code, and information identifying a license the customer has that authorizes a purchase of the controlled and/or non-controlled item. The customer may provide an identifier that identifies the customer, such as a DEA customer identifier. Further, the customer may provide the order quantity for the controlled and/or non-controlled item, the date of placing the order, and other related information such as the customer's shipping address. One of ordinary skill in the art can envision several pieces of information the customer may provide with the order in light of this disclosure.

As a result, the order is received by the distributor's order services 110 and order services 110 begin to process the order for fulfillment. In various embodiments, a component of processing the order for fulfilling is engaging the RCS application 200. Thus, looking at FIG. 3, order services 110 send a compliance check 1 to the RCS application 200. The compliance check 1 may include various order information so that the RCS application 200 can verify the license information associated with the order. Thus, in this instance, the RCS application 200 invokes the LV module 300. In response, the LV module 300 may apply various rules for license verification. For example, in particular embodiments, the LV module 300 may perform one or more checks such as checks for mandatory elements, checks for valid expiration data, checks for a grace period if a license has expired, and/or checks for name or company name, state and country if a license is valid. If license verification fails one or more of the checks, the RCS application 200 sends a message 2b back to order services 110 indicating reason for failure. If license verification does not fail, the RCS application 200 sends a message 2a back indicating a license for the order has been successfully validated.

In instances of failure in particular embodiments, the RCS application 200 (LV module 300) may call 6 a compliance authority to get updated license information if available. If updated information is not available, the RCS application 200 may send an alert 3a to file administration for the particular license. In turn, the file administration updates the license information in the RCS application 200 manually. As the license information is updated, the RCS application 200 may send an alert 3c to customer service and customer service may send a message 4 to order services 110 to continue the order workflow for the order.

In various embodiments, information may be updated or loaded from various sources for use by the RCS application 200 for license verification purposes. For instance, in particular embodiments, the RCS application 200 may receive bulk data uploads 7 from the compliance authority 109 as well as via direct requests 6 sent from the RCS application 200 to the compliance authority 109 over web services 104. In addition, in particular embodiments, users may enter license information via one or more user interfaces 5. Further, in particular embodiments, order services 110 may send the RCS application 200 order status information 2c on particular orders as the orders continue the order workflow.

In various embodiments, information may be communicated using various mechanisms. For example, in particular embodiments, the RCS application 200 may communicate with file administration and customer service with alerts or notifications. In addition, in particular embodiments, the file administration, customer service, and users may use one or more interfaces to communicate information to the RCS application 200 and/or order services 110. For example, in one embodiment, interfaces are provided as one or more webpages through the distributor's web services 104. Those of ordinary skill in the art can envision various other communication mechanisms that may be employed in light of this disclosure.

Turning now to FIG. 4, this figure illustrates a flow diagram of the LV module 300 according to an embodiment of the invention. This flow diagram may correspond to the steps carried out by the processor 205 in the application server shown in FIG. 2 as it executes the module 300 in the server's RAM memory 367 according to various embodiments.

It is noted that the LV module 300 may be configured in various embodiments to perform the functionality for the license verification process and the associated functionality needed to support the license verification process. For instance, in various embodiments, the LV module 300 may be configured to perform one or more of adding licenses, retrieving licenses, updating licenses, searching licenses, processing license verification transaction requests, searching license verification transaction data, getting license verification transaction data, and calling vendor services.

In addition, in various embodiments, the license verification process involves querying license information in order to verify a license associated with a particular inbound/outbound transaction request. In particular embodiments, such information may be stored in one or more databases and the information may be maintained and updated from various sources. As a result, the RCS application 200 may provide a number of different mechanisms for receiving, updating, and maintaining license information such as application programming interfaces (API) and user interfaces.

Returning to FIG. 4, in Step 301, the LV module 300 receives receipt/order information associated with a controlled and/or non-controlled item such as a non-controlled prescription (Rx), medical device, or controlled substance. As previously discussed, the receipt/order information may have been received from a distributor's order services 110 and may include information such as, for example, an identifier for the item and information identifying a license the customer has that authorizes the purchase of the item. The customer may also provide an identifier that identifies the customer and/or the order quantity, the date of placing the order, and other related information such as the customer's shipping address.

In Step 302, the LV module 300 validates the receipt/order information. That is, in particular embodiments, the LV module 300 determines whether the receipt/order information includes the needed information in order to perform the license verification process. In Step 303, if the LV module 300 determines the receipt/order information is invalid and/or incomplete, the LV module 300 sends a message to order services 110 advising order services 110 of the discrepancy. If the LV module 300 determines the receipt/order information is valid, the LV module 300 validates the license, shown as Step 304. This step may involve the LV module 300 querying account information associated with the particular customer to verify the customer has a valid license for making the purchase. For example, the types of licenses that may be required for any particular purchase in the United States may involve a DEA license, A DEA listed chemical license, a state license, a state controlled substances license, and/or a FDA license. The types of licenses that may be required in foreign countries, such as Canada for example, may involve a Health Canada Office of Controlled Substance license and/or a Health Canada Precursor license. Thus, for any particular order, the LV module 300 may be required to confirm the customer has one or more valid licenses to make the purchase. For instance, in various embodiments, the validation process is carried out by the LV module 300 by checking one or more pieces of information associated with the particular license. For example, in one embodiment, the LV module 300 may check the license expiration date, the license issuance state, the license issuance country, a DEA list number, and/or a drug schedule code depending on the license number and type.

In particular embodiments, when a license verification fails, the LV module 300 checks to see if updated information is available for the customer from one or more external sources, shown as Step 305. For example, the external sources may include Compliance Authority Systems, the DEA, and/or state licensing agency. Thus, in particular embodiments, the LV module 300 is configured to gather license information in real-time from such sources.

In Step 306, if updated license (or alternative customer) information is available from one or more external sources, the LV module 300 receives the license information from the external sources. For instance, in one embodiment, the LV module 300 sends a web service request to Compliance Authority Systems requesting updated license information for the customer entering the order and Compliance Authority Systems sends back the updated information via web service to the LV module 300. However, this is not the only method of communication that may be employed by the LV module 300 and/or external sources. For instance, in particular embodiments, the LV module 300 and the external sources may be configured to perform electronic data interchange (EDI) over the Internet. One of ordinary skill in the art can envision various methods that may be employed to exchange information in light of this disclosure.

In Step 307, the LV module 300 determines whether the external sources have provided updated license information. If not, the LV module 300 records the failure to verify the license for the received receipt/order verification, shown as Step 308. Thus, in particular embodiments the LV module 300 records the failure so that such information may be used for historical purposes. In addition, in particular embodiments, the LV module 300 sends one or more communications to various parties to report the failure to verify the license for the purchase. For instance, in one particular embodiment, the LV module 300 sends a communication to the distributor's order services 110. As a result, order services 110 may discontinue processing the order for fulfillment. In addition, order services 110 may send a communication to the customer informing the customer that the required license for the purchase could not be verified. Thus, in particular embodiments, the customer may be provided with order status updates in real time as the order is processed, shipped, and/or cancelled. In some instances, the customer may also be provided with the specific reasons why the required license could not be verified. As a result, in particular instances, the customer may take corrective action based on the specific reasons with respect to the current order and/or subsequent orders. For example, the customer may provide updated license information using one or more webpages provided by the distributor's web services 104 so that the current order may be processed. (The same types of communications may be provided to customers with respect to suspicious order analyses in various embodiments.) In addition, in particular embodiments, the LV module 300 may send communications to one or more other groups and/or systems on the failure such as file administration and/or customer service.

On the other hand, if updated license information is received, the LV module 300 updates the license information stored within the distributor's system architecture 100, shown as Step 309. Thus, in one particular embodiment, the LV module 300 updates the account information stored for the particular customer. Storing the license information for a variety of customers internally helps to increase the processing time to verify a license in various embodiments because the LV module 300 is not required to query license information externally for every single verification request received. Further, it is noted that in particular embodiments, the distributor receives batch license information for a number of customers periodically so that the distributor's internal information may be updated on a regular basis. For example, the distributor may receive batch updates from the compliance authority 109 on a pre-determined basis.

Once the license information has been updated, in Step 310, the LV module 300 re-validates the licensing using the updated information. Thus, in particular embodiments, this step is carried out similar to the original validation in that the LV module 300 applies the same rules as were applied for the original validation. If the license needed for the purchase is validated, the LV module 300 records information on the receipt/order passing the validation, shown as Step 311. In addition, in various embodiments, the LV module 300 send order services 110 a communication reporting the license(s) required for the purchase has been validated. As a result, order services 110 continue to process the order for fulfillment. If the LV module 300 is still unable to validate the license based on the license information obtained from the compliance authority, the LV module 300 records the failure and sends the appropriate communications to the appropriate parties, shown as Step 308.

b. SOM Module

As previously discussed, in various embodiments, the RCS application 200 may also include a SOM module 400. FIG. 5 provides an exemplary process flow for determining whether a particular order is considered suspicious. This process may be carried out for the particular order in addition to or alternatively to the license verification process discussed above. In at least the illustrated embodiment of FIG. 5, order services 110 receives an order for a controlled and/or non-controlled item such as a non-controlled prescription (Rx), or controlled substance and sends a compliance check 1 to the RCS application 200. The customer placing the order may provide several pieces of information according to certain embodiments. For example, similar to the license verification process, the request may provide a number of different pieces of information such as an identifier for the item, information identifying the customer, the order quantity, the date of placing the order, and other related information such as the customer's shipping address. In response, the RCS application 200 is configured according to these and still other embodiments, as may be desirable, to invoke the SOM module 400, as described in further detail below.

Remaining with FIG. 5, in particular embodiments, the RCS application 200 may be configured to send a message 2a to order services 110 indicating the SOM analysis has been initiated. At this point, the RCS application 200 (e.g., the SOM module 400) may be configured to perform a number of checks on the information on the order to determine whether the order should be identified as suspicious. Once the analysis is completed, the RCS application 200 sends a message 4b back to order services 110 indicating whether the order has been identified as suspicious. Further, the RCS application 200 sends one or more alerts/notifications 3a to quality assurance (QA)/regulatory affairs (RA) on the outcome of the analysis. In response QA/RA may update 3b order status and notes indicating the outcome of the analysis. Finally, QA/RA may also send a message 4a to order services 110 indicating whether order services 110 should resume order flow to the next task in the flow for completing the order. As the order is further processed, in particular embodiments, order services 110 may send updates 5 to the RCS application 200.

As previously mentioned, in various embodiments, the RCS application 200 also includes a suspicious order monitoring (SOM) module 400. This module 400 is responsible for providing the functionality for performing a suspicious order monitoring analysis process and its associated functionality needed to support that process such as, for example, SOM analysis, update analysis status, manual SOM analysis, and bulk load of SOM data via user interfaces. As also mentioned, the SOM module 400 may be configured to perform one or more checks on order information to determine whether the order is suspicious. For instance, according to various embodiments, the SOM module is configured to: (1) analyze a customer's order quantity (e.g., by checking for a particular drug code and strength unit of measure (UOM)) against the customer's historical ordering pattern; (2) analyze the customer's order quantity and frequency (e.g., by checking for a particular drug code and strength unit of measure (UOM)) against the customer's historical ordering frequency; (3) analyze the customer's order quantity (e.g., by checking for a particular drug code and strength unit of measure (UOM)) against all historical orders for customers of the same type; (4) analyze the customer's order quantity (e.g., by checking for a particular drug code and strength unit of measure (UOM)) against past order history for all customers of all types; and (5) analyze the customer's order quantity (e.g., by checking for a particular drug code and strength unit of measure (UOM)) against the customer's historical ordering pattern for a specific client. In certain embodiments, one or more of these checks may be performed in any of a variety of combinations thereof, as may be desirable for particular applications. Each of these checks will now be described in greater detail, in turn.

FIG. 7 illustrates another exemplary flow diagram of the SOM module 400 according to various embodiments. This flow diagram may correspond to the steps carried out by the processor 205 in the RCS application 200 shown in FIG. 2 as it executes the module 400 in the server's RAM memory 267 according to various embodiments. Thus, in Step 412, the SOM module 400 receives the order and associated information. In Step 414, the SOM module 400 queries historical information on previous orders. In various embodiments, the historical information on previous orders may be stored in real-time because in certain instances the distributor may ship a controlled substance for a particular order to a customer on a given day and may ship and/or receive another order for the same controlled substance on the same day. Therefore, the historical information must be up-to-date so that the aggregate order quantity is accurate.

Once the SOM module 400 has queried all of the information, the SOM analysis is initiated (see also FIG. 5), whereby in Step 415 (see FIG. 7), the SOM module 400 applies the first check to the order. As is described in further detail below, in various embodiments, the first check involves the SOM module 400 comparing the order quantity for the order received by the customer with the order quantity history for the customer for the particular controlled substance. If the SOM module 400 determines the order fails the first check, the SOM module 400 sets a suspicious order indicator for the order. As a non-limiting example, the SOM module 400 sets the suspicious order indicator to "Y" as a result of the order failing the first check.

Likewise, in Step 420, the SOM module 400 applies the second check to the order. In various embodiments, the second check involves the SOM module 400 comparing the order quantity for the order received by the customer and the days since the last order was shipped to the customer for the same controlled substance with the order quantity history and the days between orders for the particular customer and controlled substance. It should be appreciated that the period of time may be measured in different units besides days for various embodiments. For instance, in other embodiments, the SOM module 400 may compare the number of hours, minutes, or months since the last order was shipped to the customer for the same controlled substance.

If the SOM module 400 determines the order fails the second check, the SOM module 400 sets a suspicious order indicator similar to the instance in which the order fails the first check. In one embodiment, the SOM module 400 sets the same suspicious order indicator as in the case of the first check. However, in another embodiment, the SOM module 400 sets a different suspicious order indicator. In this particular embodiment, each check has an independent suspicious order indicator that is set as a result of the SOM module 400 determining that the order fails the particular check. Accordingly, the distributor is able to determine from the individual suspicious order indicators which checks a particular order has failed.

In Step 425, the SOM module 400 applies the third check to the order. In various embodiments, the third check involves the SOM module 400 comparing the order quantity for the order received by the customer with order quantity history for orders received by customers of the same type for the controlled substance. In particular embodiments, the customer type for a customer is identified by the DEA registration for the customer. If the SOM module 400 determines the order fails the third check, the module sets a suspicious order indicator. As previous described, the suspicious order indicator may be the same indicator associated with the first and second checks or the indicator may be independent and associated only with the third check.

In Step 430, the SOM module 400 applies the fourth check to the order. In various embodiments, the fourth check involves the SOM module 400 comparing the order quantity for the order received by the customer with order quantity history for any customer for the particular controlled substance. If the SOM module 400 determines the order fails the fourth check, the module sets a suspicious order indicator. As previously described, the suspicious order indicator may be the same indicator associated with the first, second, and third checks or the indicator may be independent and associated only with the fourth check.

In Step 435, the SOM module 400 applies the fifth check to the order. In various embodiments, the fifth check involves the SOM module 400 comparing the order quantity for the order received by the customer with order quantity history that customer with a particular client. For example, the SOM module 400 may be configured to query historical data for a retail customer's orders with manufacturer A, or doctor B's orders with manufacturer C, or hospital F's orders with manufacturer P. In this manner, various orders with alternative manufacturers would be excluded so as to focus primarily upon historical data for a customer with a particular client or drug manufacturer. If the SOM module 400 determines the order fails the fifth check, the module sets a suspicious order indicator. As previously described, the suspicious order indicator may be the same indicator associated with the first, second, third, and fourth checks or the indicator may be independent and associated only with the fifth check.

Once the SOM module 400 has performed the five checks, in Step 440, the module determines whether the order should be identified as suspicious. In various embodiments, this involves the SOM module 400 evaluating the suspicious order indicator(s). Thus, in Step 445, if the SOM module 400 determines that the lone indicator or one or more of the individual indicators have been set as a result of the order failing a particular check, the module stores information indicating that the order has been identified as suspicious in memory. In Step 450, the process executed by the SOM module 400 ends according to various embodiments.

In various embodiments, the SOM module 400 simply stores information on the order in local memory residing in the application server 103 of FIG. 1, as also depicted in FIG. 2 (e.g., the storage device 268 residing in the RCS application 200). In another embodiment, the SOM module 400 stores the information in some type of storage media. For example, the storage media 102 shown in the RCS network infrastructure 100 depicted in FIG. 1. While in another embodiment, the SOM module 400 stores the information in some type of storage media that is external to the RCS network infrastructure 100.

Further, the information stored by the SOM module 400 may include different types of information according to various embodiments. For instance, in one embodiment, the SOM module 400 simply stores the suspicious order indicator(s). While in another embodiment, as described below, the SOM module 400 may be configured to store information, in addition to the suspicious order indicator(s), related to the check(s) performed by the module.

It should be noted that in various embodiments the SOM module 400 may be configured to determine whether the order has failed a particular check immediately after the check has been performed. That is, in these particular embodiments, the SOM module 400 may be configured to determine whether the order has failed the first check immediately after performing the first check and before performing the second check. If the order has failed the first check and the order has been identified as suspicious, the SOM module 400 may be configured to stored information on the suspicious order and not perform the remaining checks (e.g., the second, third, fourth, and fifth checks). The SOM module 400 may be configured to perform the second, third, fourth, and fifth check in the same way. As a result, in various embodiments, the SOM module 400 may execute more quickly than in instances in which the module is configured to perform all five checks regardless of whether the order fails one of the checks.

Provided below is more detail on how the SOM module 400 performs each of the five checks according to various embodiments of the invention. The additional detail is provided along with an example to better demonstrate the SOM module 400 performing these checks. Thus, the example is provided for illustrative purposes only and should not be construed to limit the scope of the invention. Indeed, additional specific details on the SOM module 400 functionality may be found in U.S. Published Patent Application 2011/0238593 entitled "Systems and Methods for Identifying Suspicious Orders," the contents of which are hereby further incorporated herein in their entirety.

i. First Check

As described above, in various embodiments, the SOM module 400 is configured to apply a first check to the order received by the customer to determine whether the order should be identified as suspicious. In particular embodiments, this may entail the SOM module 400 comparing the order quantity for the order received by the customer with the order quantity history for the customer for the particular controlled substance. Accordingly, FIG. 8 illustrates a flow diagram 500 of the SOM module 400 performing the first check according to various embodiments.

As a non-limiting example, a customer enters an order for four-hundred (400) units of the muscle relaxant Clonazepam. In the order, the Clonazepam is identified by its DEA drug code of 2737 and the customer is identified by its DEA identifier of ZZ12345678. Further, the order identifies a date of Jul. 7, 2009 as the order date.

As previous mentioned, the SOM module 400 receives the information on the order and queries the historical information on previous orders based on one or more parameters identified in the order information. For instance, in the example, the SOM module 400 queries the historical information to retrieve a sum of the shipped quantity and the number of shipments for each ship date wherein the queried records are based on the DEA drug code for each record being 2737 (e.g., Clonazepam) and the customer identifier being ZZ12345678. Thus, the SOM module 400 queries the order quantity history for orders of Clonazepam received from and shipped to the customer.

It should be noted that the unit of measure for quantity may vary from order to order in particular embodiments. For instance, the unit of measure for quantity may be each (EA), grams (GM), and/or milliliter (ML). Therefore, in these particular embodiments, the unit of measure may also be used as a parameter in querying records from the historical information.

Once the SOM module 400 has queried the historical information, the module performs the first check. In various embodiments, the SOM module 400 may make use of one or more control charts for this check (e.g., data associated with control charts). A control chart is a tool used in statistical quality control to determine if a process is operating within a specified range, or is "in control." In this case, "in control" implies that the order quantity is typical when compared to past orders. In particular embodiments, the SOM module 400 is configured to plot the order quantity by order date and use an exponentially-weighted moving average (EWMA) chart to determine whether the order quantity stays within confidence limits based on past order history. The EWMA chart is used in these particular embodiments because the chart can adapt to small and gradual drifts in the order quantity but identify large and quick changes.

Further, in various embodiments, two parameters are defined prior to the SOM module 400 creating the EWMA control chart. The first parameter is an update parameter. In various embodiments, this parameter is set to a value between zero (0) and one (1) and indicates how much weight is given to the current value and how much weight is given to the previous EWMA. Values closer to one (1) direct the algorithm to weight the current order quantity more heavily and give less weight to older orders, causing the EWMA to adapt more quickly to changes. In particular embodiments, a default value of 0.4 is used.

The second parameter is a sigma multiplier for an upper control limit. This parameter controls the confidence level of the chart. A default value of 3.0 indicates that the control limit should be set such that 99.7% of the order quantities following a normal distribution will be within the limit. Lowering the value to 1.96 will reduce the percentage to 95%. Thus, in various embodiments, the tradeoff of lowering the value is identifying more "false positives" versus possibly missing a suspicious order with a higher value of sigma.

Therefore, in various embodiments, the SOM module 400 calculates the EWMA chart based on the historical order quantities and the order quantity for the order received by the customer, shown as Step 505. In particular embodiments, the EWMA chart is sorted by shipped date. In addition, in particular embodiments the SOM module 400 calculates the standard deviation and determines the upper control limit (UCL) for the EWMA chart.

Thus, in Step 510, the SOM module 400 compares the EWMA value for the order quantity for the order received from the customer with the upper control limit. In Step 515, the SOM module 400 determines whether the EWMA value for the order quantity is greater than the upper control limit. If the SOM module 400 determines the EWMA value for the order quantity is greater than the upper control limit, the SOM module 400 sets the suspicious order indicator for the order, shown as Step 520. 600

Therefore, returning to the example, the SOM module 400 calculates the EWMA chart for the historical order quantities and the order quantity for the order received by the customer and determines that the upper control limit for the chart is 159.8 units. A non-limiting and exemplary chart in this regard may be found in U.S. Published Patent Application 2011/0238593 entitled "Systems and Methods for Identifying Suspicious Orders," the contents of which, as has been previously noted, are hereby further incorporated herein in their entirety.

ii. Second Check

Further, in various embodiments, the SOM module 400 is configured to apply a second check to the order received by the customer to determine whether the order should be identified as suspicious. In particular embodiments, this may entail the SOM module 400 comparing the order quantity for the order received by the customer and the days since the last order was shipped to the customer for the same controlled substance with the order quantity history and the days between orders for the particular customer and controlled substance. Accordingly, FIG. 9 illustrates a flow diagram 600 of the SOM module 400 performing the second check according to various embodiments.

In various embodiments, the SOM module 400 factors in a period of time (e.g., number of days) since the last order was shipped for the controlled substance and the order quantity on the last order to determine an order rate that is typical and then compares the order with respect to the order rate. For instance, in one embodiment, the SOM module 400 uses the equation $Q=D*N$ to define a line in which replenishment orders received from the customer for the controlled substance should fall close to. (In the equation $Q=D*N$, Q is the replenishment order quantity, D is the average daily ship rate (e.g., the average daily ship quantity), and N is the time period (e.g., number of days) since the last replenishment order was placed.) With the use of this equation, the variability is expected to increase as the time period between orders gets larger in various embodiments. As a result, the upper control limit for a control chart based on the equation is a function of both quantity and time.

Thus, in Step 605, the SOM module 400 calculates a control chart based on the queried historical information on previous orders received from the customer for the controlled substance. For instance, in one particular embodiment, the control chart includes an x-axis of time period between consecutive orders (e.g., number of days between consecutive orders) and a y-axis of daily shipped quantity. A non-limiting and exemplary chart in this regard may be found in U.S. Published Patent Application 2011/0238593 entitled "Systems and Methods for Identifying Suspicious Orders," the contents of which, as has been previously noted, are hereby further incorporated herein in their entirety.

Further, in Step 610, the SOM module 400 calculates the period of time since the last order was shipped for the customer for the controlled substance. The SOM module 400 then compares the order quantity to the upper control limit for the corresponding time period on the x-axis of the control chart, shown as Step 615. In Step 620, the SOM module 400 determines whether the order quantity is greater than the upper control limit that corresponds to the calculated period of time. If the SOM module 400 determines that the order quantity is greater than the upper control limit, the check module 300 sets the suspicious order indicator for the order, shown as Step 625. In Step 630, the process executed by the SOM module 400 to apply the second check ends according to various embodiments.

Thus, returning to the example, the SOM module 400 calculates that is has been eight days since the previous order of Clonazepam was shipped to the customer. Therefore, the SOM module 400 determines whether the order quantity for the order of Clonazepam is greater than the upper control limit. If, for example, the upper control limit is calculated as 376 units, the exemplary present order quantity of 400 units is greater than. As a result, the SOM module 400 sets the suspicious order indicator for the order.

iii. Third Check

As previously mentioned, in various embodiments, the SOM module 400 is also configured to apply a third check to the order received by the customer to determine whether the order should be identified as suspicious. In particular embodiments, this may entail the SOM module 400 comparing the order quantity for the order received by the customer with order quantity history for orders received by customers of the same type for the controlled substance. Accordingly, FIG. 10 illustrates a flow diagram 700 of the SOM module 400 performing the third check according to various embodiments.

As mentioned, in various embodiments, the SOM module 400 queries historical information of previous orders for the controlled substance. Further, as mentioned, in various embodiments, the queried record may be grouped by customer type. In particular embodiments, the customer type may be the customer type assigned by the DEA. Thus, in these particular embodiments, the SOM module 400 retrieves the records from the historical information with the same identifier for the controlled substance and the same customer type as the customer who placed the order. That is, the SOM module 400 may retrieve the records from the records originally queried from the historical information (e.g., a subset of the queried records) or the SOM module 400 may query the historical information directly for the records.

In Step 705, the SOM module 400 begins the process for applying the third check by calculating a threshold value based on the queried historical information to compare to the order quantity received on the order for the controlled substance. For instance, in various embodiments, the SOM module 400 simply sets the threshold value to a percentage of the historical order quantities that the order quantity for the order received must fall under. For example, the threshold value may be set to 95% and therefore the order quantity must be within the order quantities of 95% of the historical orders received and shipped for the controlled substance for the customer type. Yet, in other embodiments, the SOM module 400 calculates a threshold value based on using either a common or a specialized probability distribution model for the historical quantities for the customer type. As a non-limiting example, the SOM module 400 may use a normal distribution and set the threshold value to the ninety-fifth percentile (e.g., two standard deviations of the mean).

Following the calculation, the SOM module 400 compares the order quantity on the order received from the customer with the threshold value, in Step 710. In Step 715, the SOM module 400 determines whether the order quantity is greater than the threshold value. In Step 720, if the SOM module 400 determines the order quantity is greater than the threshold value, the SOM module 400 sets the suspicious order indicator for the order. In Step 725, the process executed by the SOM module 400 to apply the third check ends according to various embodiments.

Thus, returning to the example, the customer type for the customer who has placed the order is "Retail Pharmacy." The SOM module 400 retrieves four-hundred and fifty-nine records for historical orders shipped for the controlled substance Clonazepam to customers with the customer type of "Retail Pharmacy." The SOM module 400 sets the threshold value to 95%, evaluates the historical order quantities for Clonazepam, and determines the order quantity received for the order by the customer of 400 is higher than 98% of the historical order quantities for customers of the same type. As a result, the SOM module 400 sets the suspicious order indicator for the order.

iv. Fourth Check

Further, in various embodiments, the SOM module 400 is configured to apply a fourth check to the order received by the customer to determine whether the order should be identified as suspicious. In particular embodiments, this may entail the SOM module 400 comparing the order quantity for the order received by the customer with order quantity history for any customer for the particular controlled substance. Thus, the SOM module 400 basically performs the same steps as the third check with a different set of retrieved historical records. In this particular instance, the SOM module 400 does not limit the retrieved records to the same customer type as the customer who placed the order. The SOM module 400 retrieves records for all of the historical orders placed and shipped for the controlled substance. An exemplary flow diagram 800 of the SOM module 400 performing the fourth check according to various embodiments is illustrated in FIG. 11.

It is worth mentioning that, similar to the third check, in performing the fourth check, the SOM module 400 sets a threshold value (e.g., Step 805) and determines whether the order quantity for the order received from the customer is greater than the threshold (e.g., Steps 810 & 815). In various embodiments, the SOM module 400 sets the threshold using similar mechanisms as described above with respect to the third check. Therefore, returning to the continuing non-limiting example, the SOM module 400 retrieves three-thousand nine-hundred and seventeen historical records for orders received and shipped for Clonazepam. The SOM module 400 sets the threshold value to 95%, evaluates the historical order quantities for Clonazepam, and determines the order quantity received for the order by the customer of 400 is higher than 86% of the historical order quantities for all customers. As a result, the SOM module 400 does not set the suspicious order indicator for the order (e.g., Step 820). In Step 825, the process executed by the SOM module 400 to apply the fourth check ends according to various embodiments.

v. Fifth Check

Further, in various embodiments, the SOM module 400 is configured to apply a fifth check to the order received by the customer to determine whether the order should be identified as suspicious. An exemplary flow diagram 900 of the SOM module 400 performing the fifth check according to various embodiments is illustrated in FIG. 12.

In particular embodiments, applying the fifth check may entail the SOM module 400 setting a threshold value (e.g., Step 905) and comparing the order quantity (e.g., Step 910) for the order received by the customer with order quantity history for that customer with a particular manufacturer (i.e., client) of the particular controlled substance. Thus, the SOM module 400 basically performs substantially the same steps as the third and fourth checks, as described previously herein, but with a different set of retrieved historical records. In this particular instance, the SOM module 400 does not limit the retrieved records to the same customer type (as in the third check) or leave them unlimited entirely (as in the fourth check). Instead, under the fifth check, the SOM module 400 retrieves records for all of the historical orders placed by a particular customer and shipped by a particular client (i.e., manufacturer) for the controlled substance.

Similar to the third and fourth checks, the SOM module 400 sets a threshold value (e.g., Step 905) and then determines whether the order quantity for the order received from the customer is greater than the threshold (e.g., Step 915). In various embodiments, the SOM module 400 sets the threshold using similar mechanisms as described above with respect to the third and fourth checks. Therefore, returning to the example, the SOM module 400 retrieves a certain number of historical records for orders received from Customer A and shipped by Manufacturer B for Clonazepam. The SOM module 400 sets the threshold value to 95%, evaluates the historical order quantities for Clonazepam associated with this particular customer and manufacturer, and determines the order quantity received for the order by the customer of 400 is higher than 86% of the historical order quantities. As a result, the SOM module 400 may set the suspicious order indicator for the order (e.g., Step 920), after which point, in Step 925, the process of applying the fifth check ends.

III. Exemplary Interfaces

As previously mentioned, in various embodiments, information may be gathered and stored related to various license verifications and suspicious order analyses performed. Further, in various embodiments, the distributor may provide one or more user interfaces for collecting and displaying this stored information. In particular embodiments, the distributor may also provide one or more interfaces that allow the performance of "what if" analyses on orders for customers before receiving the orders and to view the results from the analyses and either save or discard them.

In particular embodiments, the distributor may provide customers with the ability to view all historical license verifications and suspicious order analyses for the particular customers. In addition, such capability may allow customers (and other parties) to perform auditing of order activities and other system activities, such as, for example, activities involving license data updates, additions, and/or deletions and activities involving performing "what if" analyses. The distributor may further provide reporting capabilities for customers on historical information and/or auditing results. Such features, among other benefits, facilitate proactive troubleshooting of potential roadblocks and/or issues, thereby minimizing instances of invalid licenses and/or orders identified retroactively as suspicious.

Further, in particular embodiments, the distributor may implement a security framework to regulate the use of such interfaces and/or any of the various module previously described herein. For instance, the distributor may implement role-based permissions to control a user's ability to update license information and/or to view and discard various analyses performed. For example, such role-based permissions may include a manager role that allows for a user with such a role to view a trail on who has added, modified, and/or deleted license data and/or a view role that only allows a user with such a role to view historical license verification and/or suspicious order information.

Still further, in various embodiments, as has been previously described herein, one or more notifications may be provided to one more parties upon occurrence of certain events. As non-limiting examples, beyond those previously described, the RCS application 200 may be configured to send notifications to certain groups (i.e., individual, corporate (sub)entities, or the like) upon license verification request failures; upon SOM analysis failures; and/or upon identification of a need for manual SOM input from one or more parties within the groups. Still other configurations and/or combinations thereof may be envisioned as commonly understood in the art for notifying various users of applications and systems upon the occurrence of certain events, whether negative in nature or otherwise. As yet another non-limiting example, the SOM module may be configured to notify a user when all performed checks have been successfully passed, thereby resulting in an approved transaction.

Still further specific examples of interfaces that may be provided in various embodiments include: (1) a license verification web services interface that serves as an entry point for performing all license data verification for orders and receipts; (2) a suspicious order monitoring web services interface that serves as an entry point for performing all SOM data analysis; (3) a SOM analysis response interface to respond back to a source system (e.g., order services 110) that requests a suspicious order analysis check and provide details of the SOM analysis performed on an order with results; (4) a compliance authority (e.g., Compliance Authority Systems) verification web service interface that serves as an entry point for obtaining license data to be use in performing license verification; (5) a compliance authority bulk load and file upload interface that allows for bulk upload and files of license information from compliance authorities; and (6) a SOM file upload interface that allows for users to upload bulk SOM records to be analyzed by the RCS application 200. One such non-limiting and exemplary interface is shown in FIG. 6.

IV. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A regulatory and compliance system for verifying customer license data received with orders for regulated substances, the system comprising:
   one or more memory storage areas containing stored data related to one or more parameters associated with a plurality of customer regulatory licenses; and
   one or more computer processors configured to:
   (A) receive an order for a regulated substance from the customer, the order comprising order data comprising customer input data related to the one or more parameters associated with one of the plurality of customer regulatory licenses, said one of the plurality of customer regulatory licenses being associated with the customer;
   (B) retrieve at least a portion of the stored data contained in the one or more memory storage areas, said retrieved portion having been received from a party other than the customer;
   (C) compare the customer input data and the retrieved portion of the stored data to identify one or more discrepancies;
   (D) in response to identifying no discrepancies, generate a successful validation report for the order, the successful validation report approving further processing of the order; and
   (E) in response to identifying one or more discrepancies:
     a. request updated data related to the stored data related to the one or more parameters associated with the one customer license associated with the customer input data;
     b. in response to receiving the updated data, compare the customer input data and the updated data to determine whether the one or more discrepancies remain;
     c. in response to identifying no remaining discrepancies, generate a successful validation report for the order request; and
     d. in response to identifying one or more remaining discrepancies, generate an unsuccessful validation report for the order request.

2. The regulatory and compliance system of claim 1, wherein the one or more computer processors are further configured to transmit any generated reports to at least one user of the system.

3. The regulatory and compliance system of claim 1, wherein the one or more computer processors are further configured to transmit the successful validation report to at least one user of the system.

4. The regulatory and compliance system of claim 1, wherein the one or more computer processors are further configured to periodically request the updated data related to one or more parameters associated with the plurality of customer licenses of the stored data.

5. The regulatory and compliance system of claim 1, wherein the substance is at least one of a controlled substance, a non-controlled prescription, and a medical device.

6. The regulatory and compliance system of claim 1, wherein the customer input data comprises one or more of an item identifier, a Drug Enforcement Administration (DEA) drug code, a customer license number, a customer identifier, a DEA customer number, an order quantity, an order date, and a shipping address.

7. The regulatory and compliance system of claim 1, wherein:
the customer input data comprises an order quantity, an order date, a customer identifier identifying the customer, a customer type identifier identifying a type of customer, a client identifier identifying a client associated with the customer, and a substance identifier identifying the type of substance; and
the one or more processors are further configured to:
query historical orders from the memory comprising a historical substance identifier that matches the substance identifier, each historical order comprising a historical quantity, a ship date identifying the date the order was shipped, a historical customer identifier identifying a customer who placed the order, a historical client identifier identifying the client associated with the customer, and a historical customer type identifier identifying the type of customer;
apply one or more checks to the order, each of the one or more checks being configured to identify the order as suspicious upon failure of the check; and
in response to the order being marked as suspicious, store information associated with the order in the memory to facilitate further investigation.

8. The regulatory and compliance system of claim 7, wherein the one or more checks comprise:
(1) determining whether the order quantity is greater than a first upper control limit value, the first upper control limit value being derived from the historical quantities for a first subset of the historical orders, the first subset of the historical orders comprising the historical orders with the historical customer identifiers that match the customer identifier, and in response to the order quantity being greater than the first upper control limit value, marking the order as suspicious;
(2) calculating a period of time between the order date for the order and the ship date for a previous consecutive historical order from the historical orders with the historical customer identifier that matches the customer identifier, determining whether the order quantity is greater than a second upper control limit value, the second upper control limit value being derived from the period of time and the historical quantities for a second subset of the historical orders, the second subset of the historical orders comprising the historical orders with the historical customer identifiers that match the customer identifier, and in response to the order quantity being greater than the second upper control limit value, marking the order as suspicious;
(3) determining whether the order quantity is greater than a first threshold value, the first threshold value being derived from the historical quantities for a third subset of the historical orders, the third subset of the historical orders comprising the historical orders with the historical customer type identifiers that match the customer type identifier, and in response to the order quantity being greater than the first threshold value, marking the order as suspicious;
(4) determining whether the order quantity is greater than a second threshold value, the second threshold value being derived from the historical quantities of the historical orders, and in response to the order quantity being greater than the second threshold value, marking the order as suspicious; and
(5) determining whether the order quantity is greater than a third threshold value, the third threshold value being derived from the historical quantities for a fourth subset of the historical orders, the fourth subset of the historical orders comprising the historical orders with the historical customer and client identifiers that match the customer and client identifiers, and in response to the order quantity being greater than the third threshold value, marking the order as suspicious.

9. A computer-implemented method for license verification related to orders of one or more regulated substances, the method comprising the steps of:
(A) receiving and storing, within one or more memory storage areas, order data associated with an order for a regulated substance placed by a customer, the order data comprising customer input data related to the one or more parameters associated with one of the plurality of customer licenses associated with the customer;
(B) retrieving from the one or more memory storage areas at least a portion of stored data, the stored data having been received from a party other than the customer and comprising data related to one or more parameters associated with a plurality of customer regulatory licenses;
(C) comparing, via at least one computer processor, the customer input data and the retrieved portion of the stored data to identify one or more discrepancies;
(D) in response to identifying no discrepancies, generating, via the at least one computer processor, a successful validation report for the order, the successful validation report approving further processing of the order; and
(E) in response to identifying one or more discrepancies:
a. requesting, via the at least one computer processor, updated data related to the stored data related to one or more parameters associated with the one customer license associated with the customer input data;
b. in response to receiving the updated data, comparing, via the at least one computer processor, the customer input data and the updated data to determine whether the one or more discrepancies remain;
c. in response to identifying no remaining discrepancies, generating, via the at least one computer processor, a successful validation report for the order request, the successful validation report approving further processing of the order and
d. in response to identifying one or more remaining discrepancies, generating, via the at least one computer processor, an unsuccessful validation report for the order request, the unsuccessful validation report preventing further processing of the order.

10. The computer-implemented method of claim 9, wherein:
the customer input data comprises an order quantity, an order date, a customer identifier identifying the customer, a customer type identifier identifying a type of customer, a client identifier identifying a client associated with the customer, and a substance identifier identifying the type of substance; and
the method further comprising the steps of:
querying, via the at least one computer processor, historical orders from the memory comprising a historical substance identifier that matches the substance identifier, each historical order comprising a historical quantity, a ship date identifying the date the order was shipped, a historical customer identifier identifying a customer who placed the order, a historical client identifier identifying the client associated with the customer, and a historical customer type identifier identifying the type of customer;
applying, via the at least one computer processor, one or more checks to the order, each of the one or more checks being configured to identify the order as suspicious upon failure of the check; and in response to the order being marked as suspicious, storing information associated with the order in the memory to facilitate further investigation.

11. The computer-implemented method of claim 10, wherein the one or more checks comprise:
(1) determining, via the at least one computer processor, whether the order quantity is greater than a first upper control limit value, the first upper control limit value being derived from the historical quantities for a first subset of the historical orders, the first subset of the historical orders comprising the historical orders with the historical customer identifiers that match the customer identifier, and in response to the order quantity being greater than the first upper control limit value, marking the order as suspicious;
(2) calculating, via the at least one computer processor, a period of time between the order date for the order and the ship date for a previous consecutive historical order from the historical orders with the historical customer identifier that matches the customer identifier, determining whether the order quantity is greater than a second upper control limit value, the second upper control limit value being derived from the period of time and the historical quantities for a second subset of the historical orders, the second subset of the historical orders comprising the historical orders with the historical customer identifiers that match the customer identifier, and in response to the order quantity being greater than the second upper control limit value, marking the order as suspicious;
(3) determining, via the at least one computer processor, whether the order quantity is greater than a first threshold value, the first threshold value being derived from the historical quantities for a third subset of the historical orders, the third subset of the historical orders comprising the historical orders with the historical customer type identifiers that match the customer type identifier, and in response to the order quantity being greater than the first threshold value, marking the order as suspicious;
(4) determining, via the at least one computer processor, whether the order quantity is greater than a second threshold value, the second threshold value being derived from the historical quantities of the historical orders, and in response to the order quantity being greater than the second threshold value, marking the order as suspicious; and
(5) determining, via the at least one computer processor, whether the order quantity is greater than a third threshold value, the third threshold value being derived from the historical quantities for a fourth subset of the historical orders, the fourth subset of the historical orders comprising the historical orders with the historical customer and client identifiers that match the customer and client identifiers, and in response to the order quantity being greater than the third threshold value, marking the order as suspicious.

12. A computer program product comprising at least one non-transitory computer-readable storage medium having computer-readable program code portions embodied therein, the computer-readable program code portions comprising:
a first executable portion configured for receiving data associated with a customer license received with an order for regulated substances, wherein the data comprises:
order data associated with an order for a regulated substance placed by a customer, the order data comprising customer input data related to the one or more parameters associated with one of the plurality of customer licenses associated with the customer; and
stored data, the stored data being received from a party other than the customer and comprising data related to one or more parameters associated with a plurality of customer regulatory licenses;
a second executable portion configured for comparing the customer input data and at least a portion of the stored data to identify one or more discrepancies; and
a third executable portion configured, in response to identifying one or more discrepancies, for:
requesting updated data related to the stored data related to the one or more parameters associated with the one customer license associated with the customer input data;
in response to receiving the updated data, compare the customer input data and the updated data to determine whether the one or more discrepancies remain:
in response to identifying no remaining discrepancies, generate a successful validation report for the order request, the successful validation report approving further processing of the order; and
in response to identifying one or more remaining discrepancies, generate an unsuccessful validation report for the order request, the unsuccessful validation report preventing further processing of the order.

13. The computer program product of claim 12, wherein:
the customer input data comprises an order quantity, an order date, a customer identifier identifying the customer, a customer type identifier identifying a type of customer, a client identifier identifying a client associated with the customer, and a substance identifier identifying the type of substance; and
the method further comprising the steps of:
querying, via the at least one computer processor, historical orders from the memory comprising a historical substance identifier that matches the substance identifier, each historical order comprising a historical quantity, a ship date identifying the date the order was shipped, a historical customer identifier identifying a customer who placed the order, a historical client identifier identifying the client associated with the customer, and a historical customer type identifier identifying the type of customer;
applying, via the at least one computer processor, one or more checks to the order, each of the one or more checks being configured to identify the order as suspicious upon failure of the check, the one or more checks comprising:
(1) determining whether the order quantity is greater than a first upper control limit value, the first upper control limit value being derived from the historical quantities for a first subset of the historical orders, the first subset of the historical orders comprising the historical orders with the historical customer identifiers that match the customer identifier, and in response to the order quantity being greater than the first upper control limit value, marking the order as suspicious;
(2) calculating a period of time between the order date for the order and the ship date for a previous consecutive historical order from the historical orders with the historical customer identifier that matches the customer identifier, determining whether the order quantity is greater than a second upper control limit value, the second upper control limit value being derived from the period of time and the historical quantities for a second subset of the historical orders, the second subset of the historical orders comprising the historical orders with the historical customer identifiers that match the customer identifier, and in response to the order quantity being greater than the second upper control limit value, marking the order as suspicious;

(3) determining whether the order quantity is greater than a first threshold value, the first threshold value being derived from the historical quantities for a third subset of the historical orders, the third subset of the historical orders comprising the historical orders with the historical customer type identifiers that match the customer type identifier, and in response to the order quantity being greater than the first threshold value, marking the order as suspicious;

(4) determining whether the order quantity is greater than a second threshold value, the second threshold value being derived from the historical quantities of the historical orders, and in response to the order quantity being greater than the second threshold value, marking the order as suspicious; and (5) determining whether the order quantity is greater than a third threshold value, the third threshold value being derived from the historical quantities for a fourth subset of the historical orders, the fourth subset of the historical orders comprising the historical orders with the historical customer and client identifiers that match the customer and client identifiers, and in response to the order quantity being greater than the third threshold value, marking the order as suspicious; and in response to the order being marked as suspicious, storing information associated with the order in the memory to facilitate further investigation.

14. A regulatory and compliance system for identifying suspicious orders received for regulated substances, the system comprising:

memory; and one or more processors configured to:

receive an order for a regulated substance from a customer, the order comprising an order quantity, an order date, a customer identifier identifying the customer, a customer type identifier identifying a type of customer, and a substance identifier identifying the regulated substance;

query historical orders from the memory comprising a historical substance identifier that matches the substance identifier, each historical order comprising a historical quantity, a ship date identifying the date the order was shipped, a historical customer identifier identifying a customer who placed the order, and a historical customer type identifier identifying the type of customer;

apply checks to the order, the checks comprising:

(1) determining whether the order quantity is greater than a first upper control limit value, the first upper control limit value being derived from the historical quantities for a first subset of the historical orders, the first subset of the historical orders comprising the historical orders with the historical customer identifiers that match the customer identifier, and in response to the order quantity being greater than the first upper control limit value, marking the order as suspicious;

(2) calculating a period of time between the order date for the order and the ship date for a previous consecutive historical order from the historical orders with the historical customer identifier that matches the customer identifier, determining whether the order quantity is greater than a second upper control limit value, the second upper control limit value being derived from the period of time and the historical quantities for a second subset of the historical orders, the second subset of the historical orders comprising the historical orders with the historical customer identifiers that match the customer identifier, and in response to the order quantity being greater than the second upper control limit value, marking the order as suspicious;

(3) determining whether the order quantity is greater than a first threshold value, the first threshold value being derived from the historical quantities for a third subset of the historical orders, the third subset of the historical orders comprising the historical orders with the historical customer type identifiers that match the customer type identifier, and in response to the order quantity being greater than the first threshold value, marking the order as suspicious;

(4) determining whether the order quantity is greater than a second threshold value, the second threshold value being derived from the historical quantities of the historical orders, and in response to the order quantity being greater than the second threshold value, marking the order as suspicious; and (5) determining whether the order quantity is greater than a third threshold value, the third threshold value being derived from the historical quantities for a fourth subset of the historical orders, the fourth subset of the historical orders comprising the historical orders with the historical customer and client identifiers that match the customer and client identifiers, and in response to the order quantity being greater than the third threshold value, marking the order as suspicious; and in response to the order being marked as suspicious, store information associated with the order in the memory to facilitate further investigation.

15. The regulator and compliance system of claim 4, wherein the one or more computer processors are further configured to:

(A) receive an order for a regulated substance from a customer, the order comprising order data comprising customer input data related to the one or more parameters associated with one of the plurality of customer regulatory licenses associated with the customer;

(B) retrieve at least a portion of the stored data contained in the one or more memory storage areas;

(C) compare the customer input data and the retrieved portion of the stored data to identify one or more discrepancies;

(D) in response to identifying no discrepancies, generate a successful validation report for the order, the successful validation report approving further processing of the order;

(E) in response to identifying one or more discrepancies, generate an unsuccessful validation report for the order.

16. The regulatory and compliance system of claim 15, wherein the one or more computer processors are further configured, in response to identifying one or more discrepancies, to:

request updated data related to the stored data related to one or more parameters associated with the one customer license associated with the customer input data;

in response to receiving the updated data, compare the customer input data and the updated data to determine whether the one or more discrepancies remain;

in response to identifying no remaining discrepancies, generate a successful re-validation report for the order request; and in response to identifying one or more remaining discrepancies, generate an unsuccessful re-validation report for the order request.

17. A computer-implemented method for identifying suspicious orders received for regulated substances, the method comprising the steps of:

receiving an order for a regulated substance from a customer, the order comprising an order quantity, an order date, a customer identifier identifying the customer, a customer type identifier identifying a type of customer, and a substance identifier identifying the regulated substance;

querying historical orders from memory comprising a historical substance identifier that matches the substance identifier, each historical order comprising a historical quantity, a ship date identifying the date the order was shipped, a historical customer identifier identifying a customer who placed the order, and a historical customer type identifier identifying the type of customer;

applying checks to the order via a computer device, the checks comprising:

(1) the computer device determining whether the order quantity is greater than a first upper control limit value, the first upper control limit value being derived from the historical quantities for a first subset of the historical orders, the first subset of the historical orders comprising the historical orders with the historical customer identifiers that match the customer identifier, and in response to the order quantity being greater than the first upper control limit value, marking the order as suspicious;

(2) the computer device calculating a period of time between the order date for the order and the ship date for a previous consecutive historical order from the historical orders with the historical customer identifier that matches the customer identifier, determining whether the order quantity is greater than a second upper control limit value, the second upper control limit value being derived from the period of time and the historical quantities for a second subset of the historical orders, the second subset of the historical orders comprising the historical orders with the historical customer identifiers that match the customer identifier, and in response to the order quantity being greater than the second upper control limit value, marking the order as suspicious;

(3) the computer device determining whether the order quantity is greater than a first threshold value, the first threshold value being derived from the historical quantities for a third subset of the historical orders, the third subset of the historical orders comprising the historical orders with the historical customer type identifiers that match the customer type identifier, and in response to the order quantity being greater than the first threshold value, marking the order as suspicious;

(4) the computer device determining whether the order quantity is greater than a second threshold value, the second threshold value is derived from the historical quantities of the historical orders, and in response to the order quantity being greater than the second threshold value, marking the order as suspicious; and (5) the computer device determining whether the order quantity is greater than a third threshold value, the third threshold value being derived from the historical quantities for a fourth subset of the historical orders, the fourth subset of the historical orders comprising the historical orders with the historical customer and client identifiers that match the customer and client identifiers, and in response to the order quantity being greater than the third threshold value, marking the order as suspicious; and in response to the order being marked as suspicious, storing information associated with the order in the memory to facilitate further investigation.

18. The computer-implemented method of claim 17, further comprising the steps of:

(A) receiving and storing, within one or more memory storage areas, order data associated with an order for a regulated substance placed by a customer, the order data comprising customer input data related to the one or more parameters associated with one of the plurality of customer licenses associated with the customer;

(B) retrieving from the one or more memory storage areas at least a portion of stored data, the stored data comprising data related to one or more parameters associated with a plurality of customer regulatory licenses;

(C) comparing, via at least one computer processor, the customer input data and the retrieved portion of the stored data to identify one or more discrepancies;

(D) in response to identifying no discrepancies, generating, via the at least one computer processor, a successful validation report for the order, the successful validation report approving further processing of the order; and (E) in response to identifying one or more discrepancies, generating, via the at least one computer processor, an unsuccessful validation report for the order, the unsuccessful validation report preventing further processing of the order.

19. The computer-implemented method of claim 18, further comprising, prior to step (E), the steps of:

(i) in response to identifying one or more discrepancies, requesting, via the at least one computer processor, updated data related to the stored data related to one or more parameters associated with the one customer license associated with the customer input data;

(ii) in response to receiving the updated data, comparing, via the at least one computer processor, the customer input data and the updated data to determine whether the one or more discrepancies remain;

(iii) in response to identifying no remaining discrepancies, generating, via the at least one computer processor, a successful re-validation report for the order request, the successful re-validation report approving further processing of the order; and (iv) in response to identifying one or more remaining discrepancies, generating, via the at least one computer processor, an unsuccessful re-validation report for the order request, the unsuccessful validation report preventing further processing of the order.

20. A computer program product comprising at least one non-transitory computer-readable storage medium having computer-readable program code portions embodied therein, the computer-readable program code portions comprising:
- a first executable portion configured to receive an order for a regulated substance from a customer, the order comprising an order quantity, an order date, a customer identifier identifying the customer, a customer type identifier identifying a type of customer, and a substance identifier identifying the regulated substance;
- a second executable portion configured to query historical orders comprising a historical substance identifier that matches the substance identifier, each historical order comprising a historical quantity, a ship date identifying the date the order was shipped, a historical customer identifier identifying a customer who placed the order, and a historical customer type identifier identifying the type of customer;
- a third executable portion configured to apply checks to the order, the checks comprising:
  - (1) determining whether the order quantity is greater than a first upper control limit value, the first upper control limit value being derived from the historical quantities for a first subset of the historical orders, the first subset of the historical orders comprising the historical orders with the historical customer identifiers that match the customer identifier, and in response to the order quantity being greater than the first upper control limit value, marking the order as suspicious;
  - (2) calculating a period of time between the order date for the order and the ship date for a previous consecutive historical order from the historical orders with the historical customer identifier that matches the customer identifier, determining whether the order quantity is greater than a second upper control limit value, the second upper control limit value being derived from the period of time and the historical quantities for a second subset of the historical orders, the second subset of the historical orders comprising the historical orders with the historical customer identifiers that match the customer identifier, and in response to the order quantity being greater than the second upper control limit value, marking the order as suspicious;
  - (3) determining whether the order quantity is greater than a first threshold value, the first threshold value being derived from the historical quantities for a third subset of the historical orders, the third subset of the historical orders comprising the historical orders with the historical customer type identifiers that match the customer type identifier, and in response to the order quantity being greater than the first threshold value, marking the order as suspicious;
  - (4) determining whether the order quantity is greater than a second threshold value, the second threshold value is derived from the historical quantities of the historical orders, and in response to the order quantity being greater than the second threshold value, marking the order as suspicious; and
  - (5) determining whether the order quantity is greater than a third threshold value, the third threshold value being derived from the historical quantities for a fourth subset of the historical orders, the fourth subset of the historical orders comprising the historical orders with the historical customer and client identifiers that match the customer and client identifiers, and in response to the order quantity being greater than the third threshold value, marking the order as suspicious; and
- in response to the order being marked as suspicious, a fourth executable portion configured to store information associated with the order in the memory to facilitate further investigation.

21. The computer program product of claim 20, further comprising:
- a fourth executable portion configured for comparing the customer input data and at least a portion of the stored data to identify one or more discrepancies; and
- a fifth executable portion configured for generating one or more reports based upon the comparison, wherein:
  - in response to identifying no discrepancies, the fifth executable portion is configured to generate a successful validation report for the order, the successful validation report approving further processing of the order; and
  - in response to identifying one or more discrepancies, the fifth executable portion is configured to generate an unsuccessful validation report for the order, the unsuccessful validation report preventing further processing of the order.

22. The computer program product of claim 21, further comprising a sixth executable portion configured to:
- (i) in response to identifying one or more discrepancies, request updated data related to the stored data related to one or more parameters associated with the one customer license associated with the customer input data;
- (ii) in response to receiving the updated data, compare the customer input data and the updated data to determine whether the one or more discrepancies remain;
- (iii) in response to identifying no remaining discrepancies, generate a successful re-validation report for the order request, the successful re-validation report approving further processing of the order; and
- (iv) in response to identifying one or more remaining discrepancies, generate an unsuccessful re-validation report for the order request, the unsuccessful validation report preventing further processing of the order.

* * * * *